(12) United States Patent
Ishino et al.

(10) Patent No.: US 7,774,529 B2
(45) Date of Patent: Aug. 10, 2010

(54) BUS COMMUNICATION APPARATUS THAT USES SHARED MEMORY

(75) Inventors: Kouichi Ishino, Hyogo (JP); Hideyuki Kanzaki, Hyogo (JP); Kazuhiro Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 12/167,153

(22) Filed: Jul. 2, 2008

(65) Prior Publication Data

US 2009/0013115 A1  Jan. 8, 2009

(30) Foreign Application Priority Data

Jul. 3, 2007 (JP) ............................. 2007-174838
Jun. 30, 2008 (JP) ............................. 2008-169858

(51) Int. Cl.
*G06F 13/00* (2006.01)
*G06F 13/36* (2006.01)
*G06F 13/14* (2006.01)
*G06F 13/28* (2006.01)

(52) U.S. Cl. ...................... 710/107; 710/118; 710/240; 710/241; 710/244; 710/309; 711/106; 711/167

(58) Field of Classification Search ................. 710/118, 710/240, 309, 241, 244
See application file for complete search history.

(56) References Cited

U.S. PATENT DOCUMENTS 5,574,868 A * 11/1996 Marisetty .................... 710/118
5,748,969 A * 5/1998 Lee et al. ..................... 710/244
6,286,070 B1 * 9/2001 Ohara ......................... 710/113
6,513,089 B1 * 1/2003 Hofmann et al. ............ 710/309
6,654,836 B1 * 11/2003 Misra et al. ................. 710/110
7,225,281 B2 * 5/2007 Rosenbluth et al. ......... 710/104
7,533,206 B2 * 5/2009 Murakami et al. .......... 710/113
7,600,065 B2 * 10/2009 Lee ............................. 710/240
2003/0229744 A1 * 12/2003 Moss ........................... 710/240
2005/0204085 A1 * 9/2005 Fukuyama et al. .......... 710/244
2006/0047874 A1 * 3/2006 Watanabe et al. ........... 710/244

FOREIGN PATENT DOCUMENTS

JP  2004-70642   3/2004
JP  2004-86615   3/2004

* cited by examiner

*Primary Examiner*—Mark Rinehart
*Assistant Examiner*—Christopher A Daley
(74) *Attorney, Agent, or Firm*—Wenderoth, Lind & Ponack, L.L.P.

(57) ABSTRACT

Bus transfer efficiency is improved in bus communication that uses a shared memory, based on a communication origin master 101 selectively using an arbitration completion notification signal and a memory access completion notification signal. Based on the arbitration completion notification signal, the communication origin master 101 issues a command issue permission signal to the communication destination master 102, and the communication destination master 102 generates and issues a command for accessing the shared memory 12. Based on the memory access completion notification signal, the communication origin master 101 issues a command issue permission signal to the communication destination master 102, and the communication destination master 102 generates and issues a command for accessing the shared memory 12.

10 Claims, 19 Drawing Sheets

FIG. 7

MASTER INFORMATION TABLE —71

| MASTER 0 | yes |
| MASTER 1 | no |
| MASTER 2 | no |
| MASTER 3 | no |
| ⋮ | ⋮ |

FIG. 8

SLAVE ATTRIBUTE INFORMATION TABLE —81

| | MASTER 1 | MASTER 2 |
|---|---|---|
| AREA A | yes | no |
| AREA B | no | yes |
| AREA C | no | no |
| AREA D | no | no |
| ⋮ | ⋮ | ⋮ |

BUS COMMUNICATION APPARATUS THAT USES SHARED MEMORY

This application is based on application No. 2007-174838 filed in Japan, the content of which is hereby incorporated by reference.

BACKGROUND OF THE INVENTION (1) Field of the Invention

The present invention relates to a bus communication device that performs transfer of data between masters via a shared memory.

(2) Description of the Related Art

Bus communication between a plurality of masters with use of a shared memory is performed conventionally. In such bus communication, upon completing access to the shared memory, a communication origin master (hereinafter referred to simply as an origin master) outputs a trigger such as an interrupt or a completion notification signal to a communication destination master (hereinafter referred to simply as a destination master). The destination master is activated by the trigger from the origin master, and proceeds to a phase for generating a memory access command for accessing the shared memory.

Taking the bus communication apparatus of Patent Document 1 as one example, in a data transfer between processors, a transfer origin processor writes data to a shared memory, and when the writing is complete, outputs an interrupt to a transfer destination processor. Having received the interrupt, the transfer destination processor accesses the shared memory, and reads the data that has been written to the shared memory.

According to the technique disclosed in Patent Document 2, in the transfer of data from a local memory in a transfer origin system to a transfer destination system via a shared memory, data in the local memory in the transfer origin system is written directly to the shared memory using a direct memory access controller. When the writing is complete, the direct memory access controller issues an interrupt to the transfer destination system informing that the writing is complete, via an interrupt branch circuit. Having received the interrupt, the transfer destination system accesses the shared memory, and reads the data that has been written to the shared memory.

Patent Document 1: Japanese Unexamined Patent Application Publication No. 2004-86615

Patent Document 2: Japanese Unexamined Patent Application Publication No. 2004-70642

In a conventional bus communication apparatus such as those described above, the destination master is triggered to move to the memory access command generation phase by an interrupt, a origin completion notification signal, or the like, issued due to the origin master completing a data transfer that involves accessing a memory.

This, however, gives rise the problem that despite there being cases in which data coherency would be maintained even if the destination master issued a command in advance of the origin master completing the data transfer, the destination master is unable to issue the command in advance.

BRIEF SUMMARY OF THE INVENTION

The present invention was conceived in view of the stated problem, and has an object of providing a bus communication apparatus and a control method that, in the above-described case, makes it possible for a communication destination master to issue a command in advance, and that improves bus transfer efficiency.

In order to achieve the stated object, the present invention is a bus communication apparatus, including: a shared memory; a memory control unit operable to (a) arbitrate a plurality of commands each instructing access to the shared memory, so as to give an access right to one of the commands, (b) output an arbitration completion signal showing that arbitration with respect to the command given the access right is complete, (c) access the shared memory, based on the command given the access right, and (d) when the accessing of the shared memory based on the command given the access right is complete, output an access completion signal showing completion of accessing of the shared memory; a communication origin master operable to output a write command instructing writing of target data to the shared memory, programmably select one of the arbitration completion signal and the access completion signal, and, based on the selected completion signal, output a permission signal showing that issuing of a command is permitted; and a communication destination master operable to output, based on the permission signal, a read command instructing reading of the target data from the shared memory.

According to the stated structure, it is possible to programmably select either the arbitration completion signal or the access completion signal, and then output a permission signal. Therefore, compared to a conventional technique that uses only an access completion signal, the timing with which the communication destination master generates a command can be controlled more flexibly.

Here, the communication origin master, in addition to outputting the write command, may output a generation instruction signal instructing the read command to be generated, and after providing a time delay after the output of the generation instruction signal, output the permission signal showing that issuing of the read command is permitted, and the destination master may generate the read command, based on the generation instruction signal, and output the generated read command, based on the permission signal.

According to the stated structure, the communication destination master starts generating the read command at a relatively early stage, namely at the point in time of receiving the generation instruction signal. Therefore, command generation is completed earlier than it would be if it started at the point at which the permission signal was received, and the command can be issued earlier.

Here, the memory control unit may include: a command arbitration sub-unit operable to arbitrate a plurality of commands each showing access to the shared memory, so as to give an access right to one of the commands; a memory access sub-unit operable to access the shared memory based on the command given the access right; an arbitration completion signal output sub-unit operable to, when one of the commands has acquired the access right, output the arbitration completion signal; and an access completion signal output sub-unit operable to issue the access completion signal when the accessing of the shared memory based on the command given the access right is complete, and the communication origin master may include: a command output unit operable to output the write command; and a completion notification control unit operable to programmably select one of the arbitration completion signal and the access completion signal, and, based on the selected completion signal, output the permission signal.

Here, the origin master may further include: a master information table storing therein priority information pieces in correspondence with each of a plurality of masters, each priority information piece showing whether or not the corresponding master has a highest priority right in the command arbitration sub-unit, wherein the notification completion control unit may (a) judge, with use of the priority information piece that is in correspondence with the communication destination master in the master information table, whether or not the communication destination master has the highest priority right, (b) select the access completion signal when the communication destination master is judged to have the highest priority right, and (c) select the arbitration completion signal when the communication destination master is judged to not have the highest priority right.

When the communication destination master has the highest priority right, if a command of the communication destination master becomes an arbitration target before the transfer of the communication origin master is complete, there is a possibility that the order of execution of the communication origin command and the communication destination command become reversed, and therefore data coherency will be unable to be maintained. According to the stated structures, the permission signal is issued based on the access communication signal when the communication destination master has the highest priority right, and therefore data coherency is maintained.

On the other hand, when communication destination master has the highest priority right in the command arbitration unit, the order of execution will not be changed (i.e., the communication destination command will be executed after the communication origin command) if the communication destination command is issued at a relatively early stage, as long as the communication destination command is issued after the command of the communication origin is arbitrated by the command arbitration unit. Therefore, data coherency will be able to be maintained.

If the trigger for issuing the permission signal showing permission to issue a command is programmably selected in this way based on whether or not the communication destination master has the highest priority right in the command arbitration unit, data coherency can be maintained while bus efficiency is also improved.

Here, the origin master may further include: a slave attribute information table storing therein priority information pieces in correspondence with each of a plurality of masters and showing, with respect to each one of areas that compose the shared memory, whether or not access by the corresponding master has a highest priority right in the respective area, and the completion notification control unit may (a) judge, with use of the priority information piece that in the slave attribute information table is in correspondence with an area to be accessed by the communication destination master, whether or not the area to be accessed by the communication destination master has the highest priority right, (b) select the access completion signal when the area to be accessed by the communication destination master is judged to have the highest priority right, and (c) select the arbitration completion signal when the area to be accessed by the communication destination master is judged to not have the highest priority right.

According to the stated structure, if the trigger for issuing the permission signal showing permission to issue a command is programmably selected in this way based on whether or not the area that is a target of access has the highest priority right in the command arbitration unit, data coherency can be maintained while bus efficiency is also improved.

Here, the origin master may further include: a master information table storing therein first priority information pieces in correspondence with each of a plurality of masters, each first priority information piece showing whether or not the corresponding master has a highest priority right in the command arbitration sub-unit; and a slave attribute information table storing therein priority information pieces in correspondence with each of a plurality of masters and showing, with respect to each one of areas that compose the shared memory, whether or not access by the corresponding master has the highest priority right in the respective area, and the completion notification control unit may (a) judge, with use of the first priority information piece that is in correspondence with the communication destination master in the master information table, whether or not the communication destination master has the highest priority right, (b) judge, with use of the second priority information piece that in the slave attribute information table is in correspondence with an area to be accessed by the communication destination master, whether or not the area to be accessed by the communication destination master has the highest priority right, (c) select the arbitration completion signal when the communication destination master is judged to not have the highest priority right and the area to be accessed by the communication destination master is also judged to not have the highest priority right, and (d) select the access completion signal (i) when the communication destination master is judged to have the highest priority right, or (ii) when the communication destination master is judged to not have the highest priority right and also the area to be accessed by the communication destination master is judged to have the highest priority right.

According to the stated structure, if the trigger for issuing the permission signal showing permission to issue a command is programmably selected in this way based on whether or not the communication destination master has the highest priority right in the command arbitration unit and whether or not the area that is a target of access has the highest priority right in the command arbitration unit, data coherency can be maintained while bus efficiency is also improved.

Furthermore, the present invention is a bus communication apparatus, including: a shared memory; a memory control unit operable to (a) arbitrate a plurality of commands each showing access to the shared memory, so as to give an access right to one of the commands, (b) output an arbitration completion signal showing that arbitration with respect to the command given the access right is complete, and (c) access the shared memory, based on the command given the access right; a communication origin master operable to (a) output a write command instructing writing of target data to the shared memory, (b) judge whether or not access relating to the write command has a highest priority right in the arbitration, and (c) when the access is judged to not have the highest priority right, output a permission signal after receiving the arbitration completion signal with respect to the write command, the permission signal showing that issuing of a command is permitted; and a communication destination master operable to, when the permission signal is received, output a read command instructing reading of the target data from the shared memory.

In this way, when the communication destination master does not have the highest priority right in the command arbitration unit, if the permission signal showing permission to issue a command is issued after the arbitration completion signal is received, data coherency can be maintained while bus efficiency is also improved.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 7 is a structural diagram of a master information table 71 in the first embodiment;

FIG. 8 is a structural diagram of a slave attribute information table 81 in a second embodiment;

FIG. 12 is a sequence drawing pertaining to the bus communication apparatus 10 in the first embodiment, and of which

FIG. 13 is a sequence drawing pertaining to the bus communication apparatus 10 in the first embodiment, and is a continuation of FIG. 12;

FIG. 14 is a sequence drawing pertaining to the bus communication apparatus 10 in the first embodiment, and is a continuation of FIG. 12;

FIG. 17 is a sequence drawing pertaining to the bus communication apparatus 10 in the fourth embodiment, and of which

FIG. 18 is a sequence drawing pertaining to the bus communication apparatus 10 in the fourth embodiment, and is a continuation of FIG. 17;

FIG. 19 is a sequence drawing pertaining to the bus communication apparatus 10 in the fourth embodiment, and is a continuation of FIG. 17;

DETAILED DESCRIPTION OF THE INVENTION

The following describes preferred embodiments of the present invention with reference to the drawings.

First Embodiment

Figure 1:
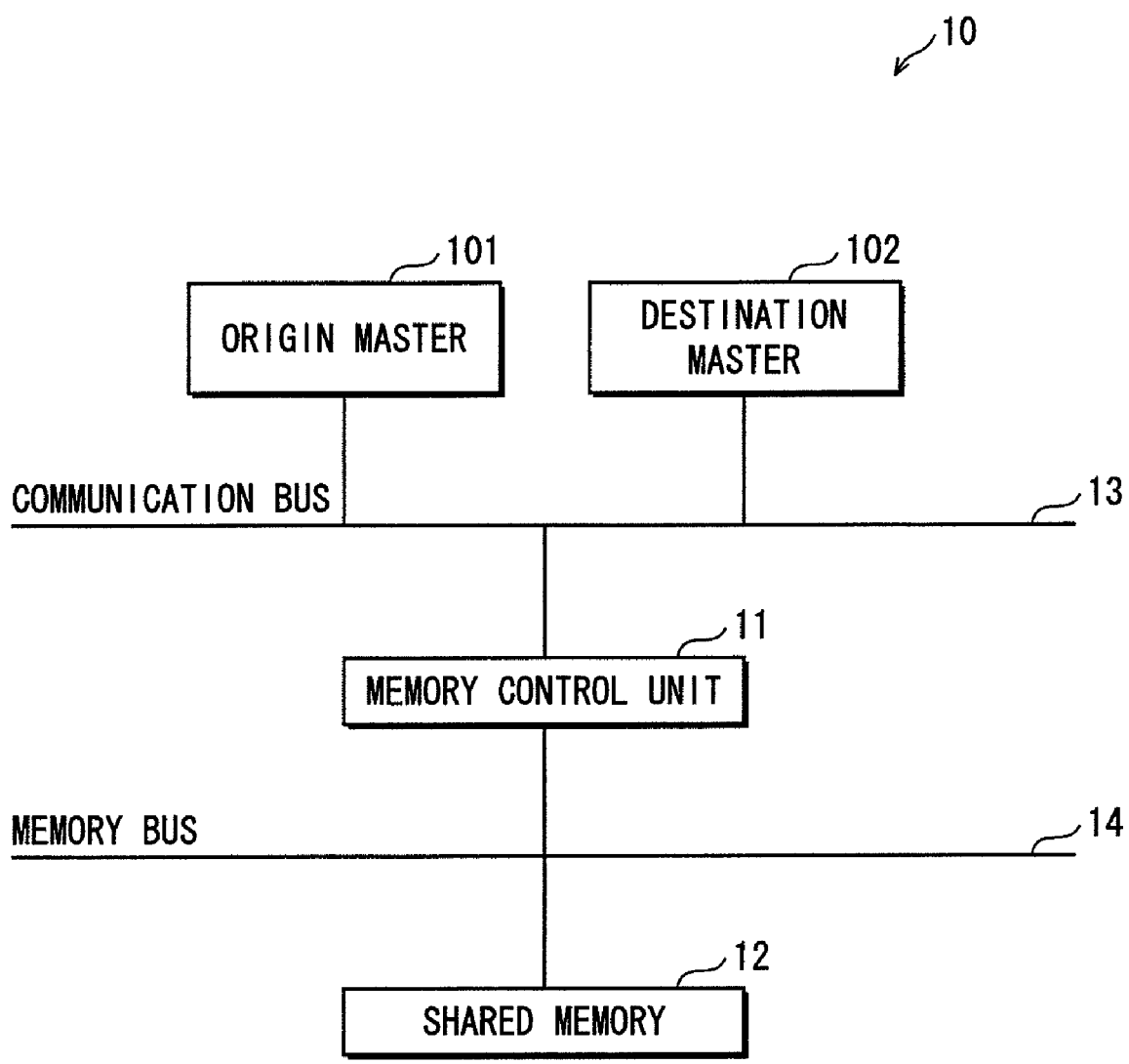
FIG. 1 is a structural diagram of a bus communication apparatus 10 of the present invention.

FIG. 1 shows the structure of a bus communication apparatus 10 in the present embodiment. The bus communication apparatus 10 shown in FIG. 1 is composed of an origin master 101, a destination master 102, a memory control unit 11, a shared memory 12, a communication bus 13, and a memory bus 14. The origin master 101, the destination master 102 and the memory control unit 11 are connected to each other via the communication bus 13. The memory control unit 11 and the shared memory 12 are connected via the memory bus 14. Note that for brevity of explanation, the bus communication apparatus 10 is described as including two masters, namely the origin master 101 and the destination master 102, but may include more than two masters. Furthermore, the origin master 101 and the destination master 102 may each, for example, be a processor.

The origin master 101 and the destination master 102 each access the shared memory 12 via the memory control unit 11.

The memory control unit 11 (a) arbitrates a plurality of commands each instructing access to the shared memory 12, so as to give an access right to one of the commands, (b) outputs an arbitration completion signal showing that arbitration with respect to the command given the access right is complete, (c) accesses the shared memory 12 based on the command given the access right, and (d) when the accessing of the shared memory 12 based on the command given the access right is complete, outputs an access completion signal showing completion of access to the shared memory 12.

The origin master 101 outputs a write command instructing writing of target data to the shared memory 12, programmably selects one of the arbitration completion signal and the access completion signal, and, based on the selected completion signal, outputs a permission signal showing that issuing of a command is permitted.

The destination master 102 outputs, based on the permission signal, a read command instructing reading of the target data from the shared memory 12.

Figure 2:
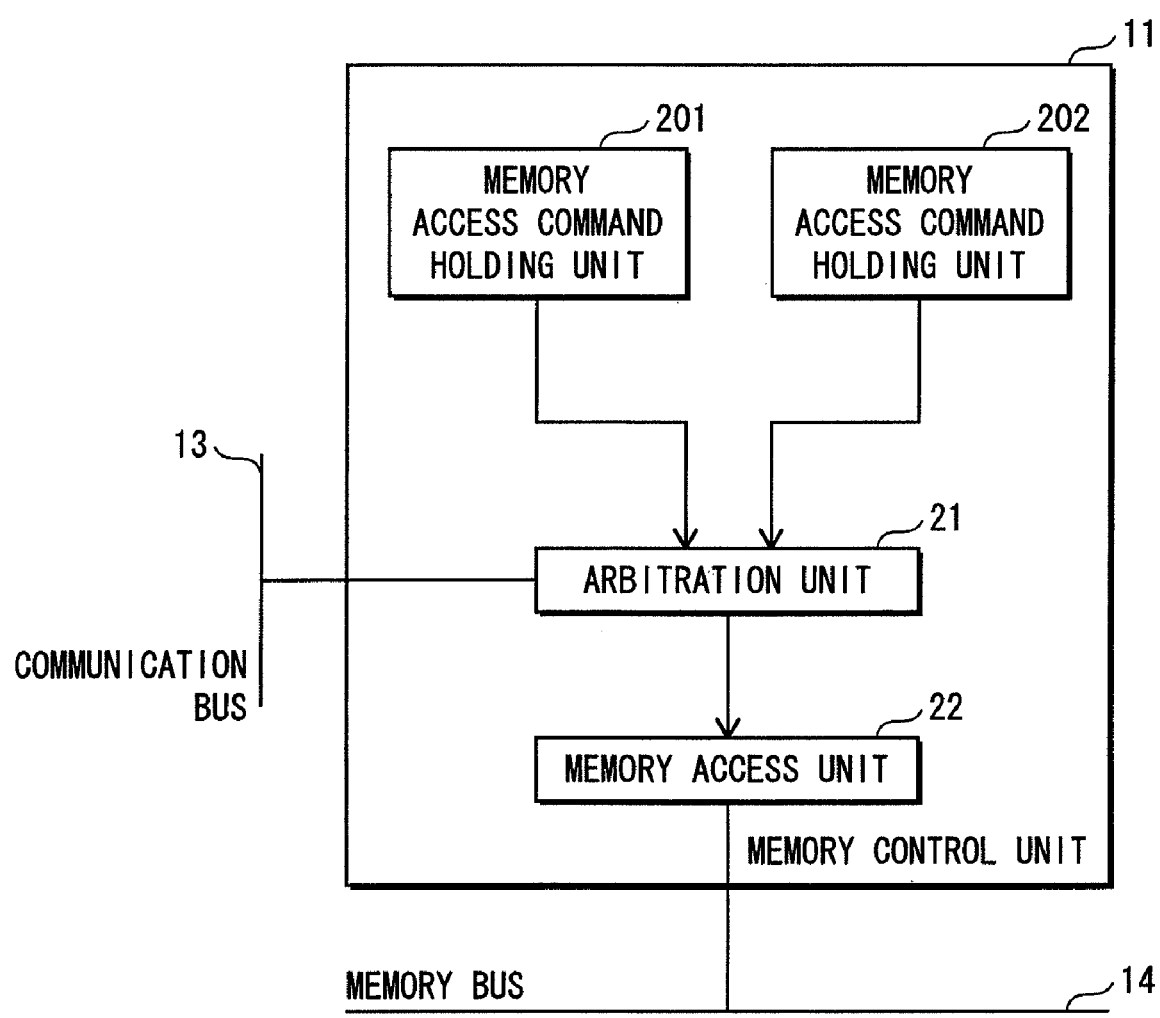
FIG. 2 is an internal structural diagram of a memory control unit 11 in a first embodiment.

FIG. 2 shows the internal structure of the memory control unit 11. As shown in FIG. 2, the memory control unit 11 is composed of memory access command holding units 201 and 202, an arbitration unit 21, and a memory access unit 22. Note that for brevity of explanation, the memory control unit 11 is described as having two memory access command holding units, namely the memory access command holding units 201 and 202, but may include more memory access command holding units. Specifically, the memory control unit 11 should have an equal number of memory access command holding units to the number of masters in the bus communication system 10.

The memory access command holding unit 201 acquires a memory access command of the origin master 101, and holds the acquired memory access command. The memory access command of the origin maser 101 is a command instructing writing of target data to the shared memory 12. Similarly, the memory access command holding unit 202 acquires a memory access command of the destination master 102, and holds the acquired memory access command. The memory access command of the destination master 102 is a command instructing reading of target data from the shared memory 12.

The arbitration unit 21 performs arbitration with respect to a plurality commands that, among memory access commands held by the memory access command holding units 201 and 202, are targets of arbitration. The arbitration unit 21 gives an access right to one of the arbitration target commands, and outputs an arbitration completion notification signal showing that arbitration with respect to the command given the access right is complete. The arbitration unit 21 arbitrates in units of memory access commands. When an access is received from a master having a highest priority right, the arbitration unit 21 stops a command being executed, executes a command having the highest priority right, and then resumes the stopped command.

The memory access unit 22 performs the actual accessing of the shared memory 12 based on the memory access command that has obtained the right to be arbitrated.

Figure 3:
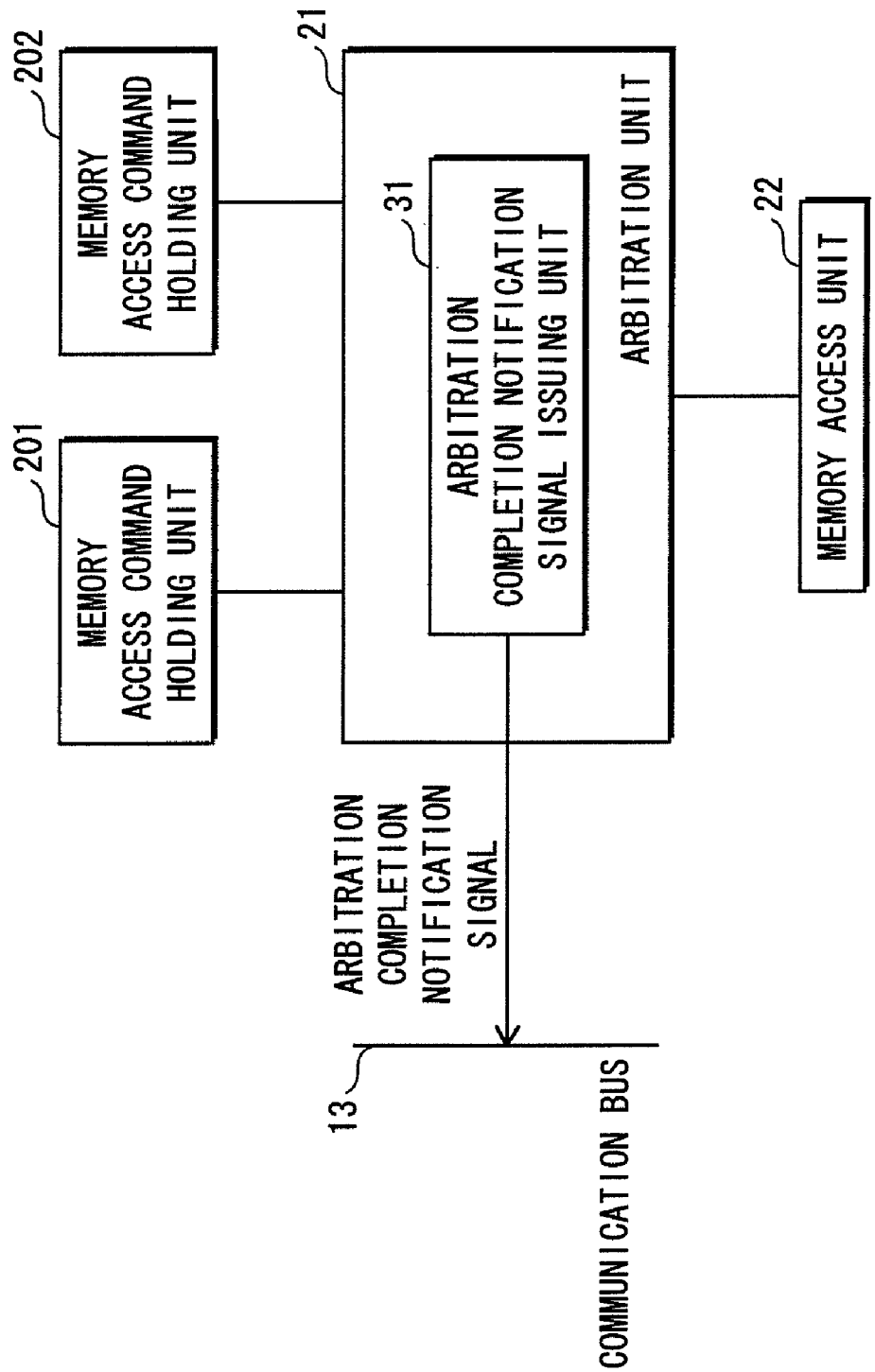
FIG. 3 is an internal structural diagram of an arbitration unit 21 in the first embodiment.

FIG. 3 shows the internal structure of the arbitration unit 21. The arbitration unit 21 includes an arbitration completion notification signal issuing unit 31 that issues an arbitration completion notification signal showing that arbitration of a memory access command is complete. The arbitration completion notification signal is issued to the master that issued the memory access command.

Figure 4:
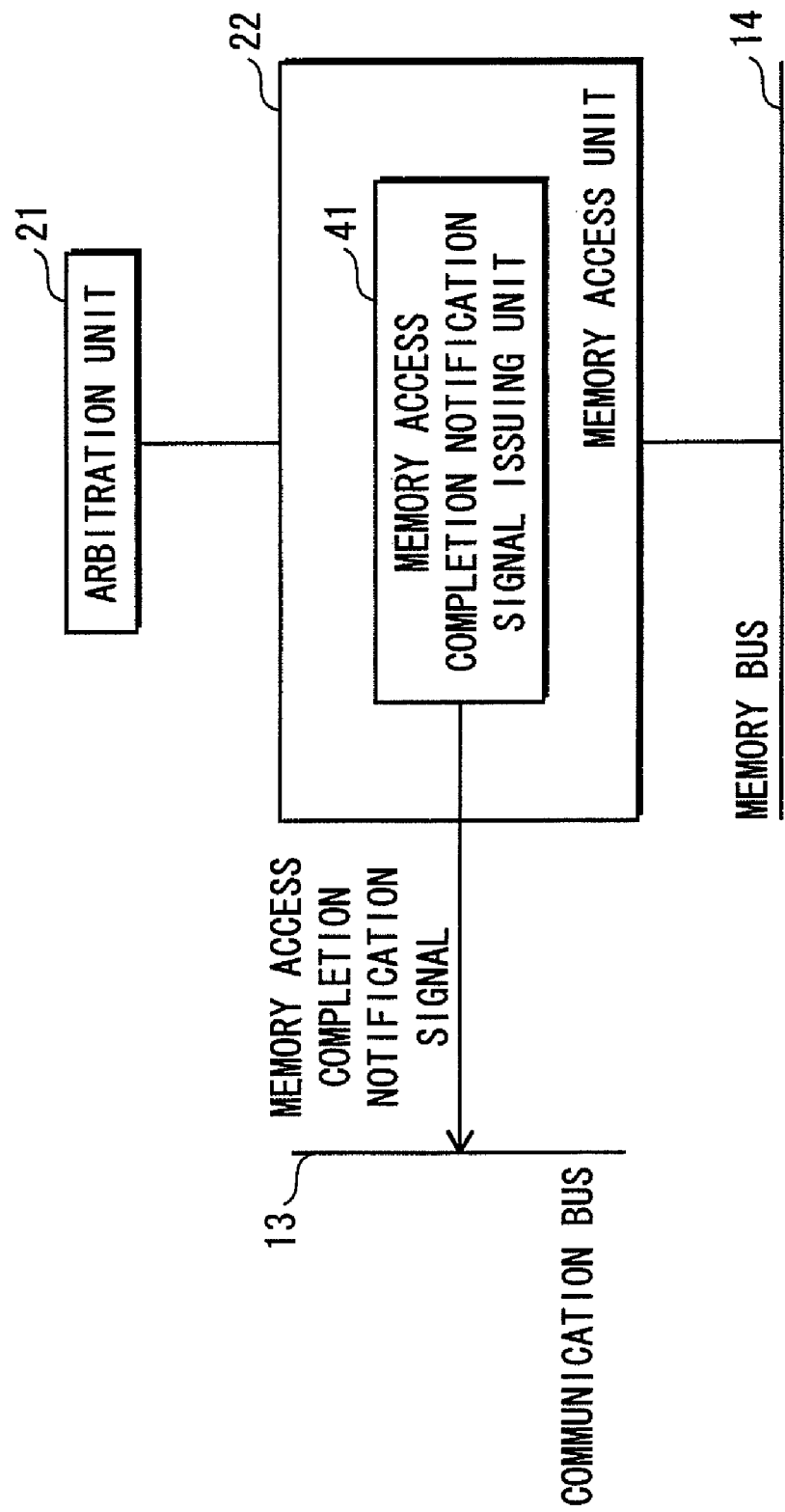
FIG. 4 is an internal structural diagram of a memory access unit 22 in the first embodiment.

FIG. 4 shows the internal structure of the memory access unit 22. The memory access unit 22 includes a memory access completion notification signal issuing unit 41 that issues a memory access completion notification signal. The memory access completion notification signal shows that access to the shared memory 12 is complete. The memory access completion notification signal is issued to the master that issued the memory access command.

Figure 5:
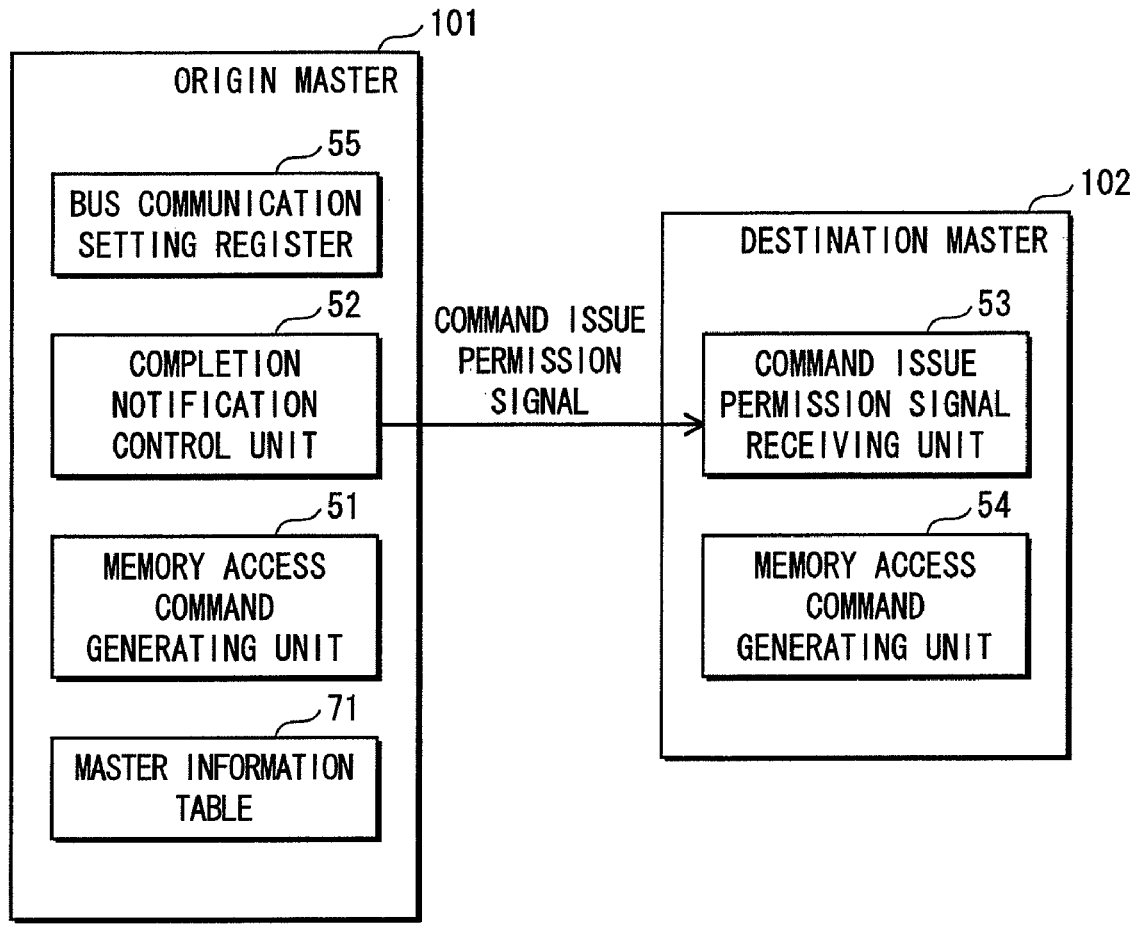
FIG. 5 is a structural diagram of an origin master 101 and a destination master 102 in the first embodiment.

FIG. 5 shows the internal structure of each master. The origin master 101 is composed of a memory access command generating unit 51, a completion notification control unit 52, a bus communication setting register 55, and a master information table 71.

Figure 6:
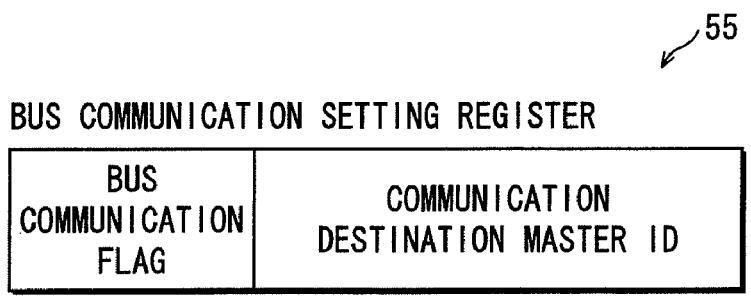
FIG. 6 is a structural diagram of a bus communication setting register 55 in the first embodiment.

FIG. 6 shows the structure of the bus communication setting register 55. The bus communication setting register 55 includes a bus transfer flag showing whether a transfer is a transfer that involves bus communication or not, and a destination master ID identifying a master that is a communication target of bus communication.

When commencing transfer, the origin master sets, in the bus communication setting register 55, the bus transfer flag showing whether a transfer is a transfer that involves bus communication or not, and a destination master ID showing which master to perform communication with when performing bus communication. The origin master 101 holds, as a master information table 71 shown in FIG. 7, information showing which master holds the highest priority right in the arbitration unit 21. The master information table 71 shows the identification number (ID) of each master in correspondence with information showing either that the corresponding master has the highest priority right or does not have the highest priority right. FIG. 7 shows an example of the master identified by the identification number (ID) "0" holding the highest priority right, and the masters identified by the identification numbers (IDs) "1" to "3" not holding the highest priority right.

The completion notification control unit 52 selects either an arbitration completion notification signal or a memory access completion notification signal for each command being executed, in accordance with the contents of the bus communication setting register 55 and the master information table 71, and notifies the destination master of completion in the origin master.

The completion notification control unit 52 makes the selection in the following manner.

The completion notification control unit 52 judges whether or not a transfer is a transfer that involves a bus transfer, according to the bus communication flag of the bus communication setting register 55. When the bus communication flag shows that the transfer is not a transfer that involves bus communication, the completion notification control unit 52 performs corresponding processing. When the bus communication flag shows that the transfer is a transfer that involves bus communication, the completion notification control unit 52 judges, with use of the master information table 71, whether or not the master shown by the communication master ID of the bus communication setting register 55 has the highest priority right. When the master shown by the communication master ID of the bus communication setting register 55 is judged to have the highest priority right by the completion notification control unit 52, the arbitration completion notification signal is selected. On the other hand, when the master is judged to not have the highest priority right, the memory access completion notification signal is selected.

The destination master 102, as shown in FIG. 5, includes a command issue permission signal receiving unit 53 and a memory access command generating unit 54.

The command issue permission signal receiving unit 53 receives a command issue permission signal from the origin master 101 via the memory control unit 11. Upon the command issue permission signal receiving unit 53 receiving the command issue permission signal, the memory access command generating unit 54 generates a memory access command of the destination master 102, and outputs the generated memory access command to the memory control unit 11.

Figure 10:
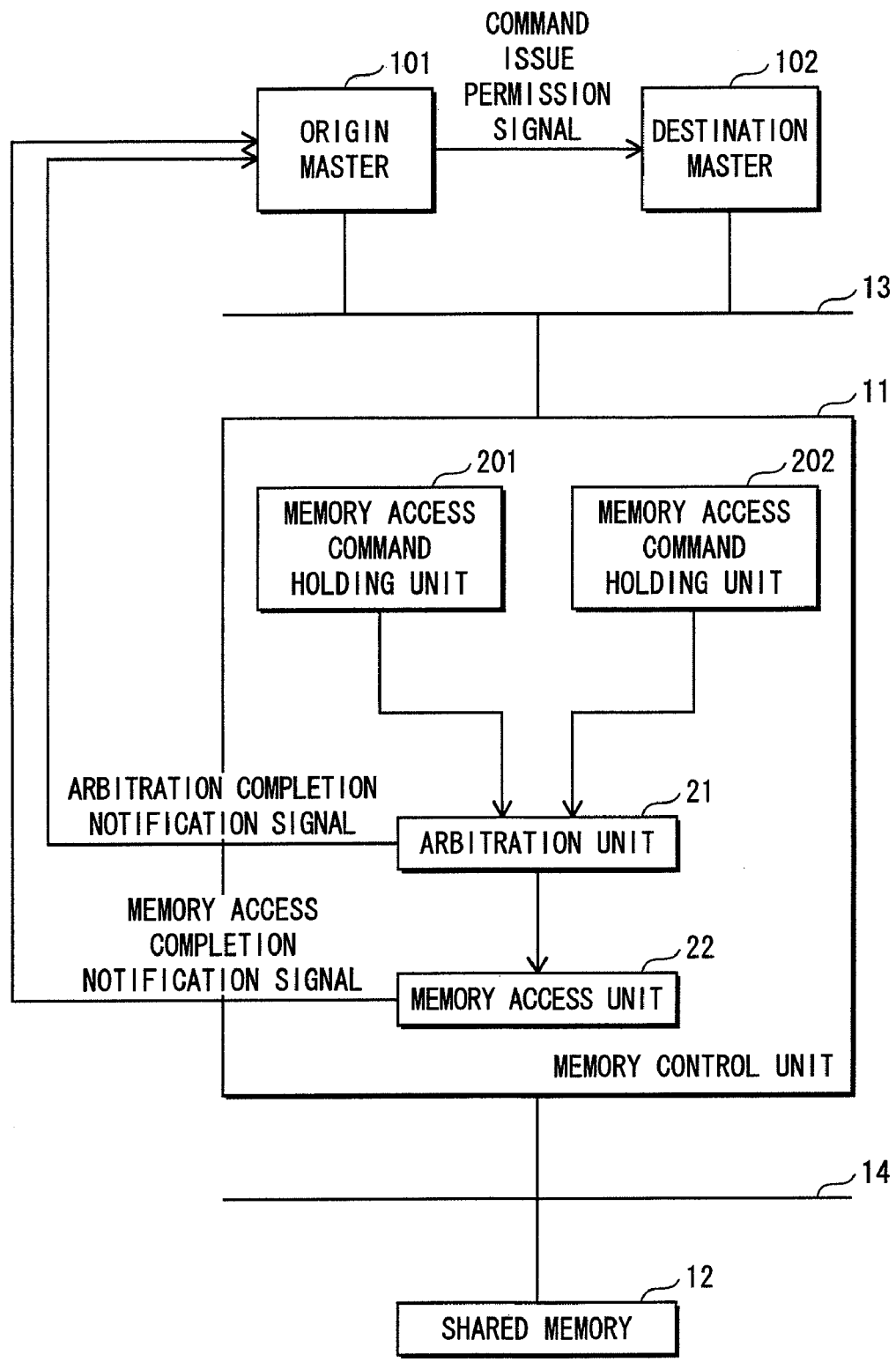
FIG. 10 is a structural diagram of the bus communication apparatus 10 of the first to third embodiments.

FIG. 10 shows the overall structure of the first embodiment.

Figure 12:
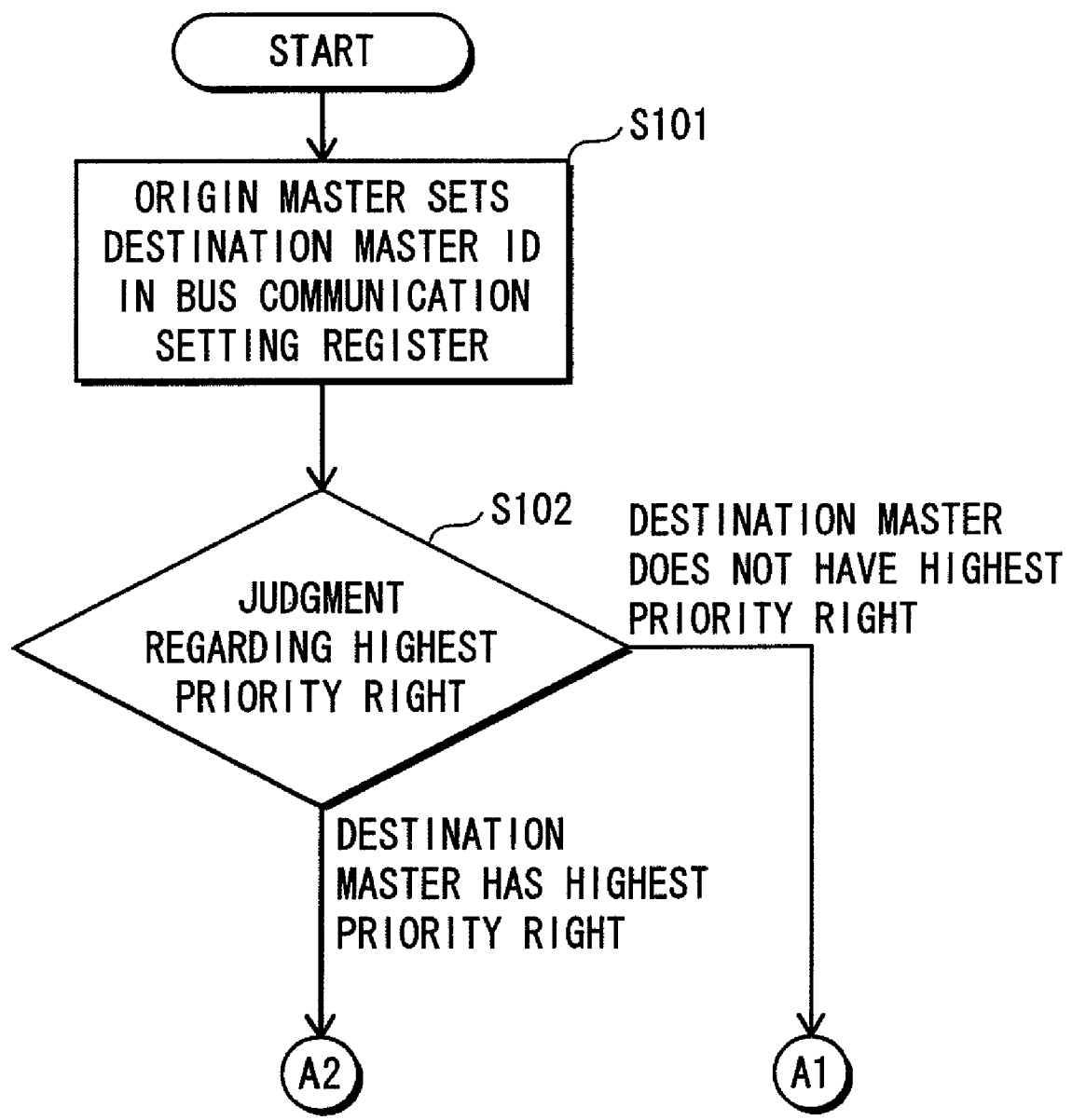
Figure 13:
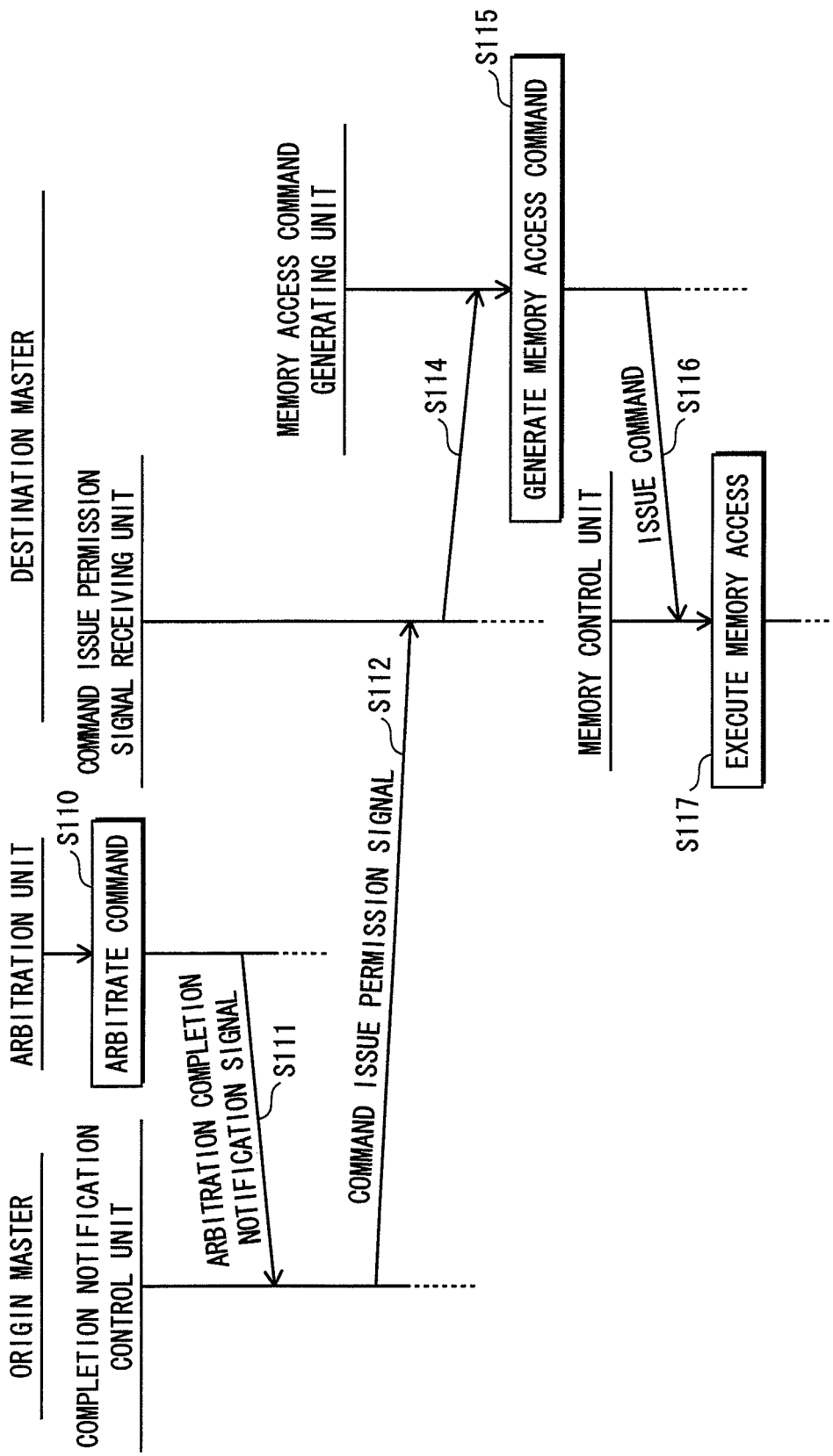
FIG. 13 and FIG. 14 are respective continuations.
Figure 14:
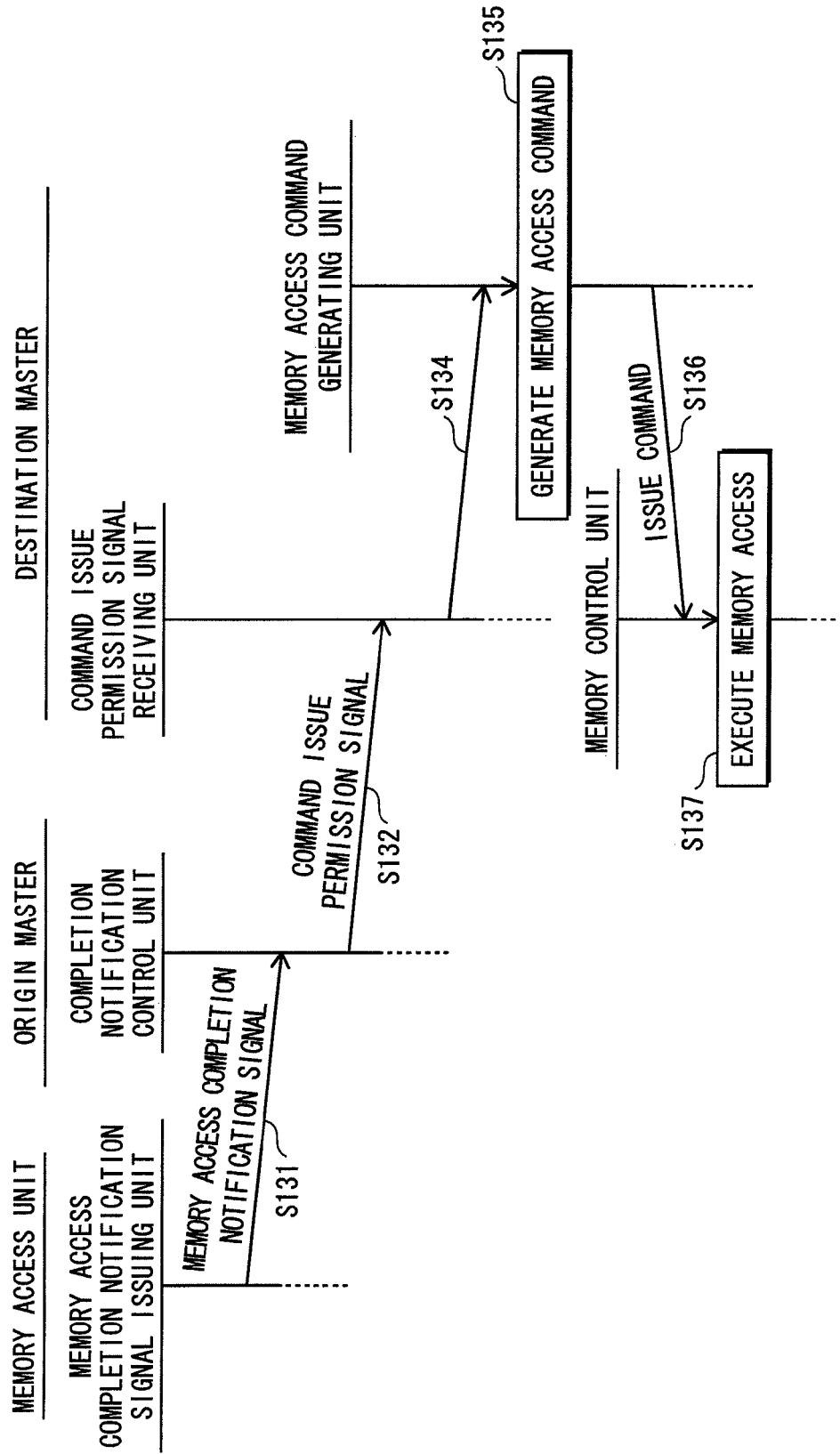

The operations of the bus communication apparatus 10 of the present embodiment are now described with use of the sequence drawings in FIG. 12 to FIG. 14.

In the bus communication apparatus 10 in the present embodiment, upon being activated, the origin master 101 sets, in the bus communication setting register 55, a bus communication flag and the destination master ID identifying the master with which bus communication will be performed (step S101). Next, with use of the master information table 71, the completion notification control unit 52 judges whether or not the master shown by the set destination master ID has the highest priority right in the arbitration unit 21 (step S102).

When the destination master does not have the highest priority right (step S102), data coherency will be maintained without changing the order of execution (i.e., the destination command will be executed after the execution of the origin command), regardless of the timing with which the destination command is issued after the origin command performed by the bus communication is arbitrated by the arbitration unit 21 (S110). For this reason, based on the arbitration completion notification signal from the arbitration completion notification signal issuing unit 31 (step S111), the completion notification control unit 52 issues a command issue permission signal to the destination master, to notify that processing of the origin master is complete (step S112).

The command issue permission signal receiving unit 53 of the destination master 102 receives the command issue permission signal (step S112), and instructs the memory access command generating unit 54 (step S114). The memory access command generating unit 54 generates a memory access command (step S115), and issues (outputs) the generated memory access command to the memory control unit 11 (step S116).

The memory control unit 11 receives the memory access command (step S116), and executes the received memory access command (step S117).

The described structure allows the destination master to generate and issue a command before the memory access by the origin master is complete. This improves bus transfer efficiency.

When the destination master has the highest priority right (step S102), if the destination master becomes the arbitration target before the transfer from the origin master is complete, there is a possibility that the execution order of the origin command and the destination command will be reversed, and data coherency will not be able to be maintained. In this case, based on the memory access completion signal from the memory access completion notification signal issuing unit 41 (step S131), the completion notification control unit 52 issues a command issue permission signal to the destination master, to notify that processing of the origin master is complete (step S132).

The command issue permission signal receiving unit 53 receives the command issue permission signal (step S132), and instructs the memory access command generating unit 54 (step S134). The memory access command generating unit 54 generates a memory access command (step S135), and issues (outputs) the generated memory access command to the memory control unit 11 (step S136).

The memory control unit 11 receives the memory access command (step S136), and executes the received memory access command (step S137).

As has been described, by using the present embodiment, either an arbitration completion notification signal or a memory access completion notification signal is selected and used, with the selection being made according to whether or not the destination master has the highest priority right in the arbitration unit 21. This improves bus transfer efficiency.

Second Embodiment

The bus communication apparatus 10 in the second embodiment is the bus communication apparatus 10 of the first embodiment, structured to refer to an attribute of the shared memory used in bus communication relating to the destination master to determine which of the arbitration completion notification signal and the memory access completion notification signal from the origin master 101 is selected.

Instead of the master information table 71, the origin master 101 holds a slave attribute information table 81. An example of the slave attribute information table 81 is shown in FIG. 8. The shared memory 12 is composed of a plurality of areas, namely an area A, an area B, an area C, an area D, and so on. The slave attribute information table 81 shows areas in the shared memory 12 in correspondence with masters, and stores information with respect to each area, showing whether or not access to that area is arbitrated by highest priority right in the arbitration unit 21. One example of the slave attribute information is as follows. The slave attribute information table 81 may show each master in correspondence with a start address and an end address of each area in the shared memory 12, and with respect to each combination of master and area start address and end address, the slave attribute table 81 may store information showing whether or not access to the corresponding area is arbitrated by the highest priority right in the arbitration unit 21. As an alternative example, the slave attribute information table 81 may show each master in correspondence with area identifiers each identifying an area in the shared memory 12, and with respect to each combination of master and area identifier, the slave attribute table 81 may store information showing whether or not access to the corresponding area is arbitrated by the highest priority right in the arbitration unit 21. The slave attribute information table 81 shown in FIG. 8 shows that with respect to the master 1, access to the area A is arbitrated by the highest priority right information in the arbitration unit 21, and that access to the area B, area C, area D and other areas is not arbitrated by the highest priority right information in the arbitration unit 21. With respect to the master 2, the slave attribute information table 81 shows that access to the area B is arbitrated by the highest priority right information in the arbitration unit 21, and that access to the area A, area C, area D and other areas is not arbitrated by the highest priority right information in the arbitration unit 21.

The completion notification control unit 52 judges, with respect to the destination master, whether or not an area that is the target of access in bus communication is an area arbitrated by highest priority right in the arbitration unit 21. The completion notification control unit 52 makes the judgment using the slave attribute information table 81. As one example, the completion notification control unit 52 acquires the address of the shared memory 12 that is the target of access in bus communication, determines a master in accordance with the destination master ID in the bus communication setting register 55, and then, using the slave attribute information table 81, judges whether or not the area shown by the acquired address is an area arbitrated by the highest priority right in the arbitration unit 21 with respect to the determined master. As a further example, the completion notification control unit 52 may select a master according to the destination master ID in the bus communication setting register 55, acquire the identifier that is the target of access in the bus communication, and then using of the slave attribute information table 81, judge whether or not the area shown by the acquired identifier is an area that is mediated by the highest priority right in the arbitration unit 21 with respect to the determined master.

Figure 15:
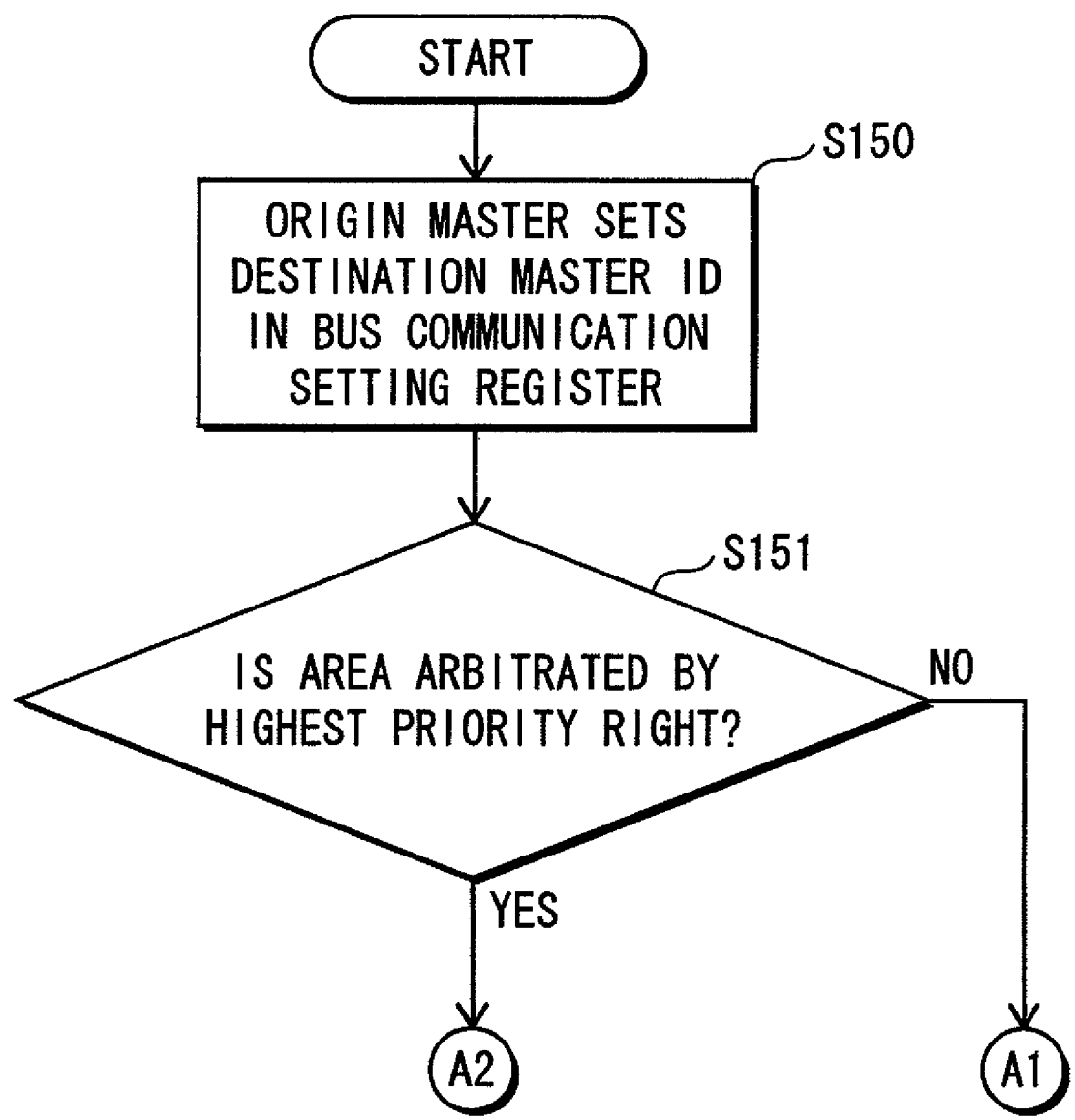
FIG. 15 is a sequence drawing pertaining to the bus communication apparatus 10 in the second embodiment.

The flow of operations of the bus communication apparatus 10 in the present embodiment are now described with use of the sequence drawings shown in FIG. 15, FIG. 13 and FIG. 14.

In the bus communication apparatus 10 in the present embodiment, upon being activated, the origin master 101 sets, in the bus communication register 55, a bus communication flag and the destination master identifying the master with which bus communication will be performed (step S150).

Next, with use of the slave attribute information table 81, the completion notification control unit 52 judges, with respect to the destination master determined according to the destination master ID, whether or not the area to be a target of access in the bus communication is an area that is arbitrated by the highest priority right in the arbitration unit 21 (step S151).

When the destination master does not have highest priority right (step S151), data coherency will be maintained without changing the order of execution (i.e., the destination command will be executed after the execution of the origin command), regardless of the timing with which the destination command is issued after the origin command performed by the bus communication is arbitrated by the arbitration unit 21. For this reason, based on the arbitration completion notification signal from the arbitration completion notification signal issuing unit 31 (step S111), the completion notification control unit 52 issues a command issue permission signal to the destination master 102, to notify that processing of the origin master is complete (step S112).

The command issue permission signal receiving unit 53 of the destination master 102 receives the command issue permission signal (step S112, step S114). The memory access command generating unit 54 generates a memory access command (step S115), and issues the generated memory access command (step S116). The memory control unit 11 receives the memory access command (step S116), and executes the received memory access command (step S117).

The described structure allows the destination master to generate and issue a command before the memory access by the origin master is complete, and thus improves bus transfer efficiency.

When the destination master has the highest priority right (step S151), there is a possibility that if a command of the destination master 102 becomes the arbitration target before the transfer from the origin master 101 is complete, the execution order of the origin command and the destination command will be reversed, and data coherency will therefore not be able to be maintained. In this case, based on the memory access completion notification signal from the memory access completion notification signal issuing unit 41 (step S131), the completion notification control unit 52 issues a command issue permission signal to the destination master, to notify that processing of the origin master is complete (step S132).

The command issue permission signal receiving unit 53 receives the command issue permission signal (step S132), and instructs the memory access command generating unit 54 (step S134). The memory access command generating unit 54 generates a memory access command (step S135), and issues the generated memory access command to the memory control unit 11 (step S136).

The memory control unit 11 receives the memory access command (step S136), and executes the received memory access command (step S137).

As has been described, by using the present embodiment, either an arbitration completion notification signal or a memory access completion notification signal is selected and used, according to whether or not the shared memory area used in bus communication has the highest priority right in the arbitration unit 21. This improves bus transfer efficiency.

Third Embodiment

The bus communication apparatus of the third embodiment makes the selection of either the arbitration completion notification signal or the memory access completion notification signal in accordance with the type of the destination master as described in the first embodiment, and also makes the selection in accordance with an attribute of the shared memory area accessed in bus communication as described in the second embodiment.

The origin master 101 holds both the master information table 71 showing which master holds the highest priority right in the arbitration unit 21, and the slave attribute information table 81 showing which area in the shared memory is arbitrated by the highest priority right in the arbitration unit 21.

Figure 16:
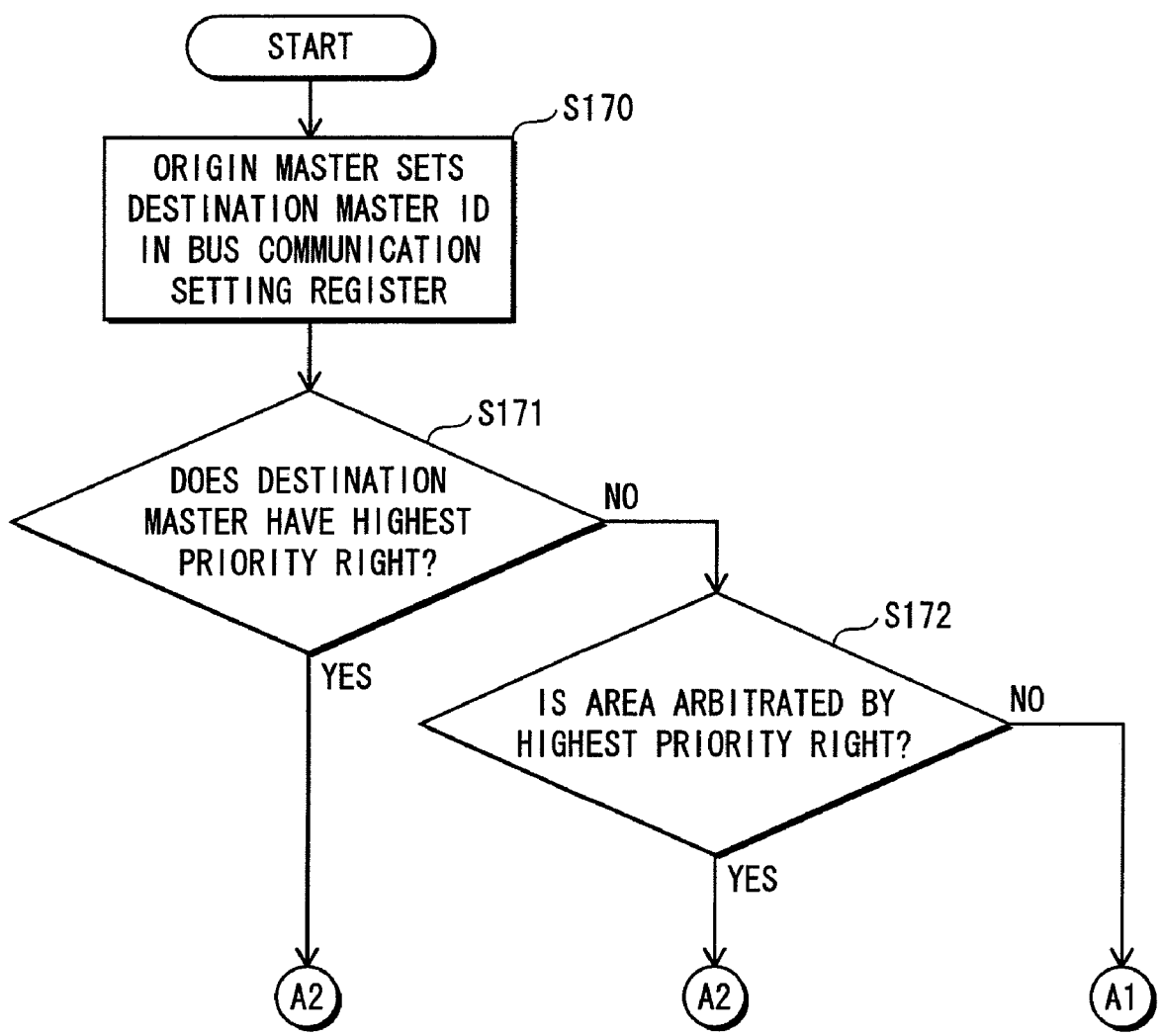
FIG. 16 is a sequence drawing pertaining to the bus communication apparatus 10 in the third embodiment.

The flow of operations of the bus communication apparatus 10 in the present embodiment is now described with use of the sequence drawings shown in FIG. 16, FIG. 13 and FIG. 14.

In the bus communication apparatus 10 in the present embodiment, upon being activated, the origin master 101 sets, in the bus communication register 55, a bus communication flag and the destination master identifying the master with which bus communication will be performed (step S170).

Next, with use of the master information table 71, the completion notification control unit 52 judges whether or not the destination master shown by the set destination ID has the highest priority right in the arbitration unit 21 (step S171).

With use of the slave attribute information table 81, the completion notification control unit 52 judges, with respect to the destination master shown by the set destination master ID, whether or not the area accessed in the bus communication is an area arbitrated by the highest priority right in the arbitration unit 21 (step S172).

When the destination master does not have the highest priority right (NO at step S171) and also the access area is not arbitrated by the highest priority right (NO at step S172), data coherency will be maintained without changing the order of execution (i.e., the destination command will be executed after the execution of the origin command), regardless of the timing with which the destination command is issued after the origin command performed by the bus communication is arbitrated by the arbitration unit 21. For this reason, based on the arbitration completion notification signal from the arbitration completion notification signal issuing unit 31 (step S111), the completion notification control unit 52 issues a command issue permission signal to the destination master 102, to notify that processing of the origin master is complete (step S112).

The command issue permission signal receiving unit 53 of the destination master receives the command issue permission signal (step S112), and the memory access command generating unit 54 generates a memory access command (step S115) and issues the generated memory access command (step S116).

The memory control unit 11 receives the memory access command (step S116), and executes the received memory access command (step S117).

The described structure allows the destination master to generate and issue a command before the memory access by the origin master is complete, and thus improves bus transfer efficiency.

When the destination master does not have the highest priority right (NO at step S171) but the access area is arbitrated by the highest priority right (YES at step S172), or when the destination master does have the highest priority right (YES at step S171), if a command of the destination master 102 becomes the arbitration target before the transfer from the origin master 101 is complete, there is a possibility that the execution order of the origin command and the destination command will be reversed, and data coherency will not be able to be maintained. In this case, based on the memory access completion notification signal from the memory access completion notification signal issuing unit 41 (step S131), the completion notification control unit 52 issues a command issue permission signal to the destination master, to notify that processing of the origin master is complete (step S132).

The command issue permission signal receiving unit 53 receives the command issue permission signal (step S132), and instructs the memory access command generating unit 54 (step S134). The memory access command generating unit 54 generates a memory access command (step S135), and issues the generated memory access command to the memory control unit 11 (step S136).

The memory control unit 11 receives the memory access command (step S136), and executes the received memory access command (step S137).

As has been described, by using the present embodiment, either an arbitration completion notification signal or a memory access completion notification signal is selected and used according whether or not the destination master has the highest priority right in the arbitration unit 21, and according to whether the shared memory area accessed in bus communication has the highest priority right in the arbitration unit 21. This improves bus transfer efficiency.

Fourth Embodiment

Figure 9:
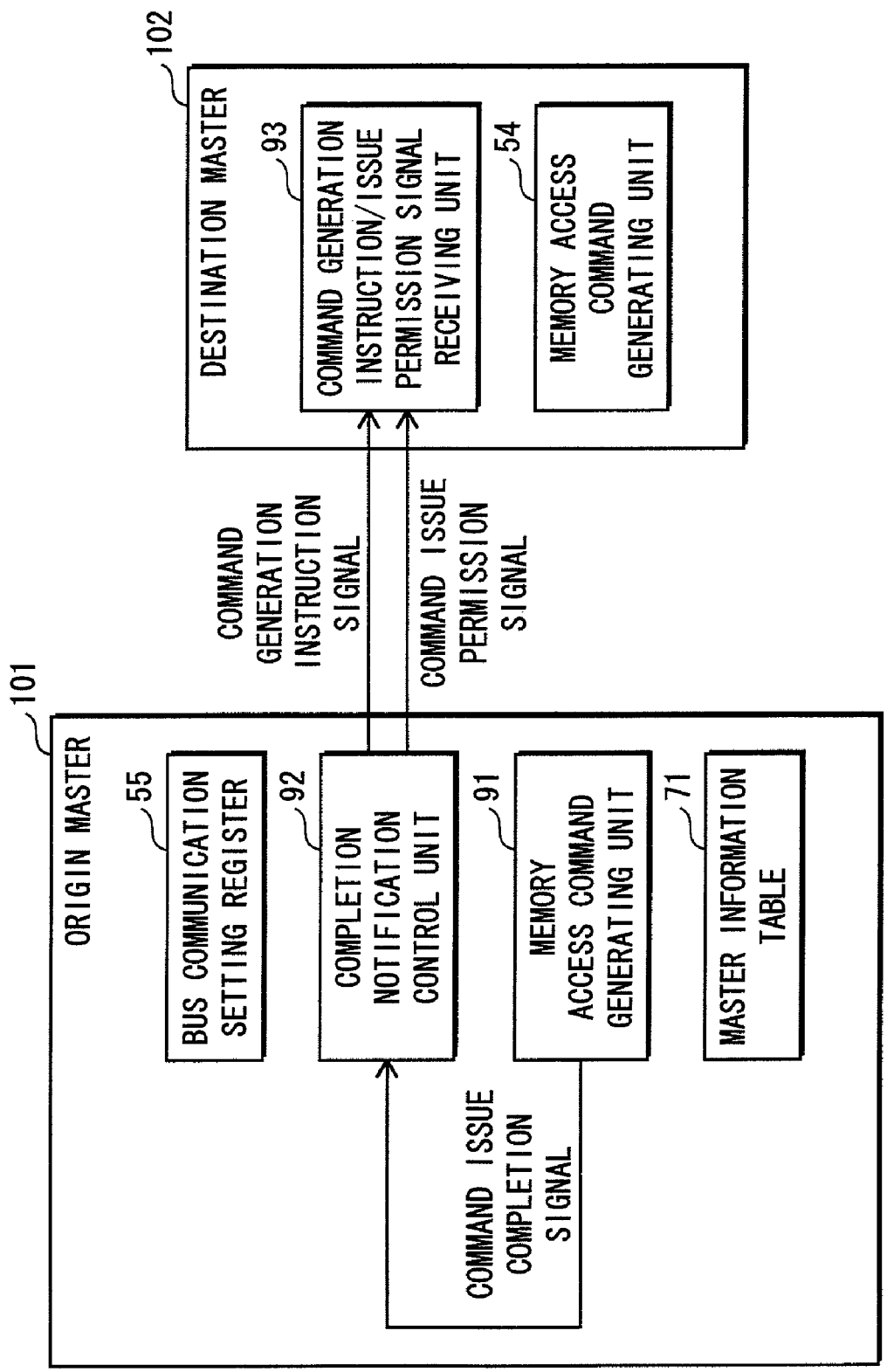
FIG. 9 is a structural diagram of the origin master 101 and the destination master 102 in a fourth embodiment.
Figure 11:
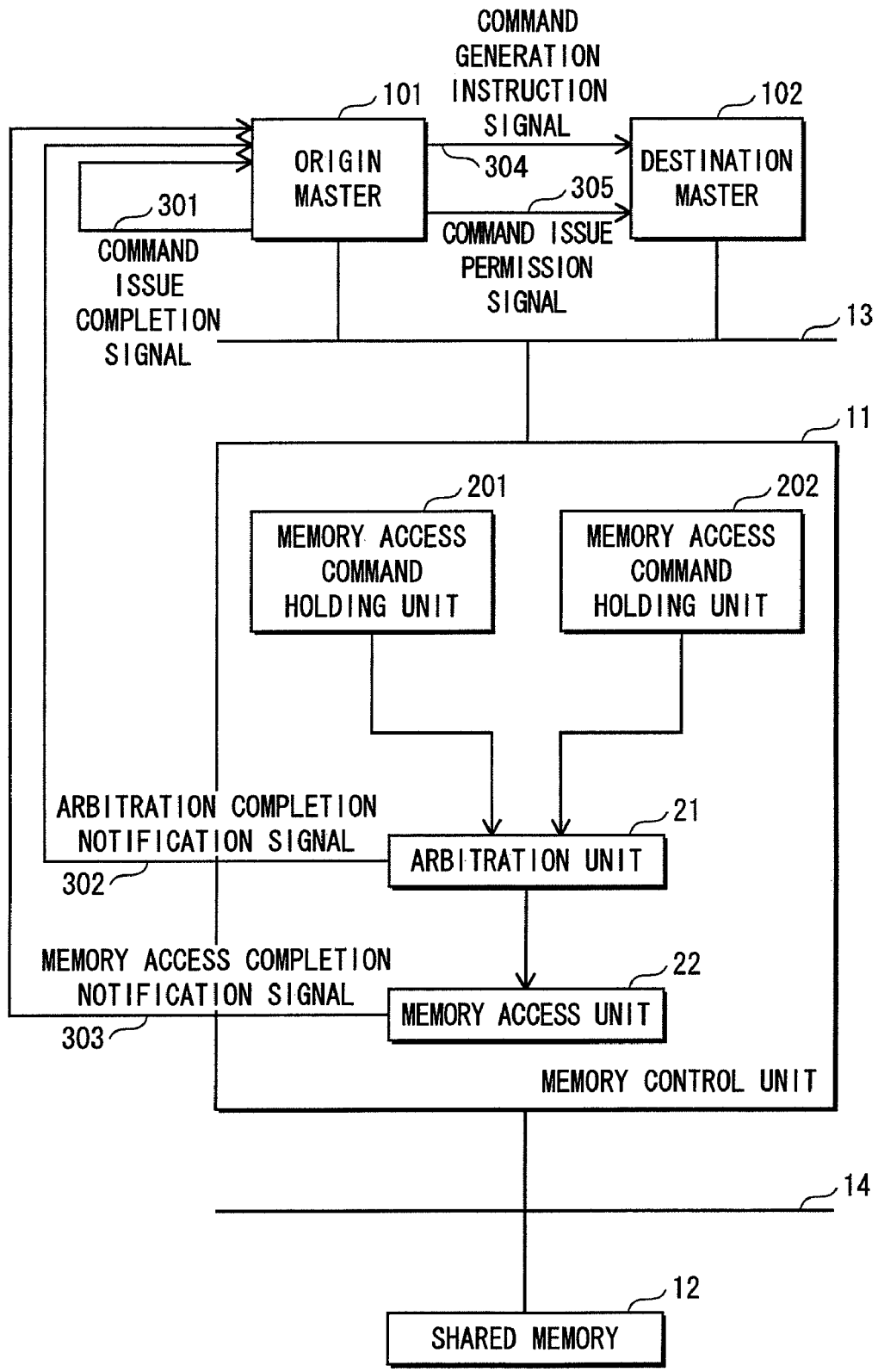
FIG. 11 is a structural diagram of the bus communication apparatus 10 of the fourth to sixth embodiments.

In the bus communication apparatus 10 in the fourth embodiment, the origin master 101 and the destination master 102 are structured as shown in FIG. 9. Notification from the origin master 101 and the destination master 102 is performed in two stages, namely a command generation instruction signal and a command issue permission signal. FIG. 9 shows the internal structure of the origin master 101 and the destination master 102 in the fourth embodiment. FIG. 11 shows the overall structure of the bus communication apparatus 10 of the fourth embodiment.

In addition to outputting a write command instructing writing of target data to the shared memory 12, the origin master 101 outputs a command generation instruction signal instructing generation of a read command instructing reading of the target data from the shared memory 12. The origin master 101 then provides a time delay before outputting a command issue permission signal showing permission to issue the read command. Based on the command generation instruction signal, the destination master 102 generates the read command, and, based on the command issue permission signal, outputs the generated read command.

As shown in FIG. 9, the origin master 101 includes a memory access command generating unit 91, a completion notification control unit 92, a bus communication setting register 55 and a master information table 71.

When starting a transfer, the origin master 101 sets, in the bus communication setting register 55, a bus communication flag showing whether or not the transfer is a transfer that involves bus communication, and a destination master ID showing which master communication is to be performed with when performing bus communication.

Using the master information table 71, the completion notification control unit 92 judges whether or not the destination master identified by the destination master ID has the highest priority right in the arbitration unit 21.

Upon completing issuing of a command, the memory access command generating unit 91 notifies a command issue completion notification signal to the completion notification control unit 92.

Upon receiving a command issue completion signal, the completion notification control unit 92 has the first stage of notification (hereinafter referred to as a command generation instruction signal) issued to the destination master in accordance with the bus communication setting register 55. Furthermore, in accordance with the bus communication setting register 55 and the master information table 71, the completion notification control unit 92 also selects either an arbitration completion notification signal or a memory access completion notification signal, and has the second state of notification (hereinafter referred to as a command issue permission signal) issued to the destination master.

A command generation instruction/issue permission signal receiving unit 93 receives the command generation instruction signal, and upon receiving the command generation instruction signal, instructs the memory access command generating unit 54 to generate a command of the destination master.

Upon receiving the command generation instruction signal, the memory access command generating unit 54 starts generating a destination command, and then upon receiving the command issue permission signal, issues the generated command.

Figure 17:
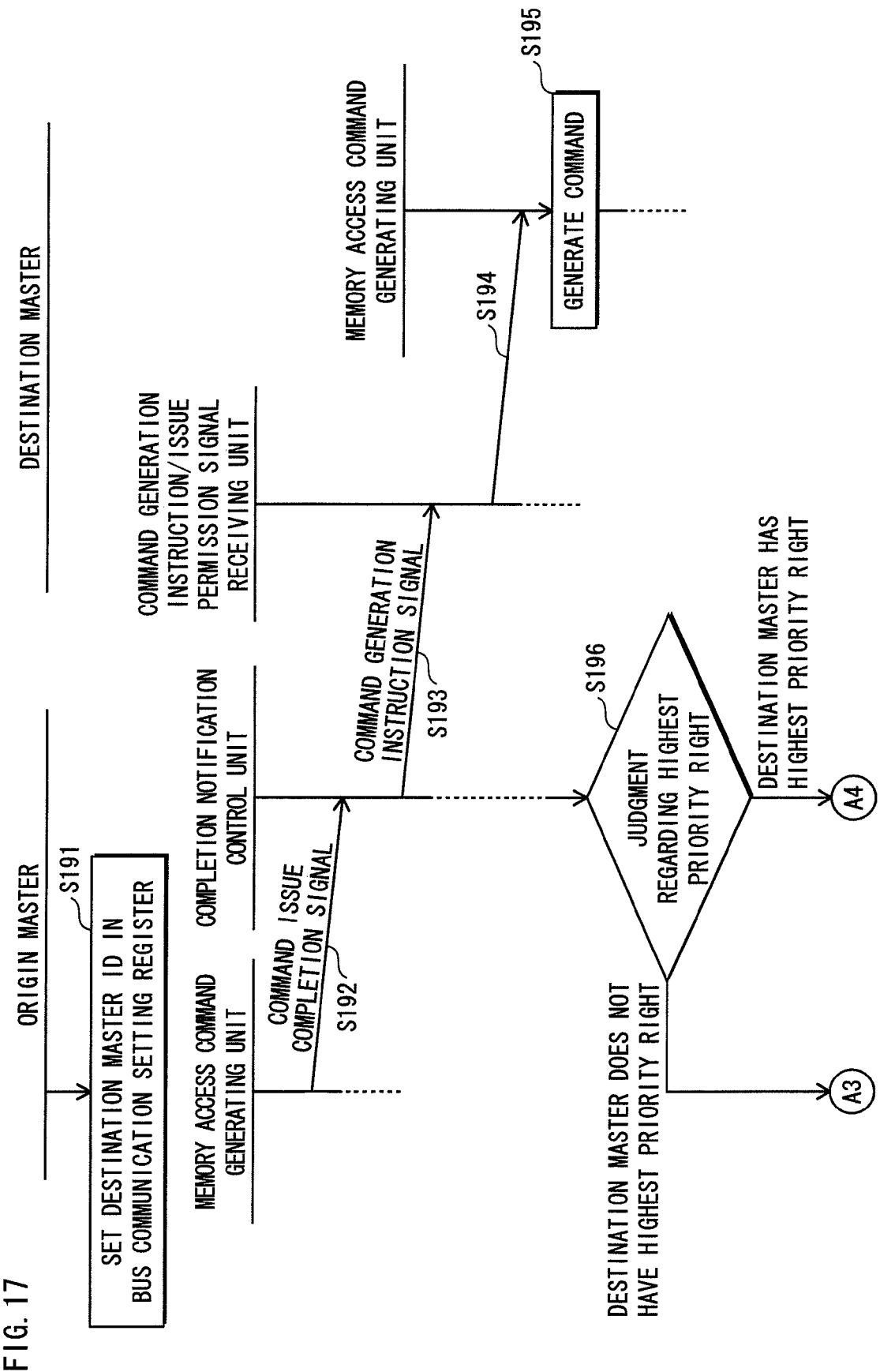
Figure 18:
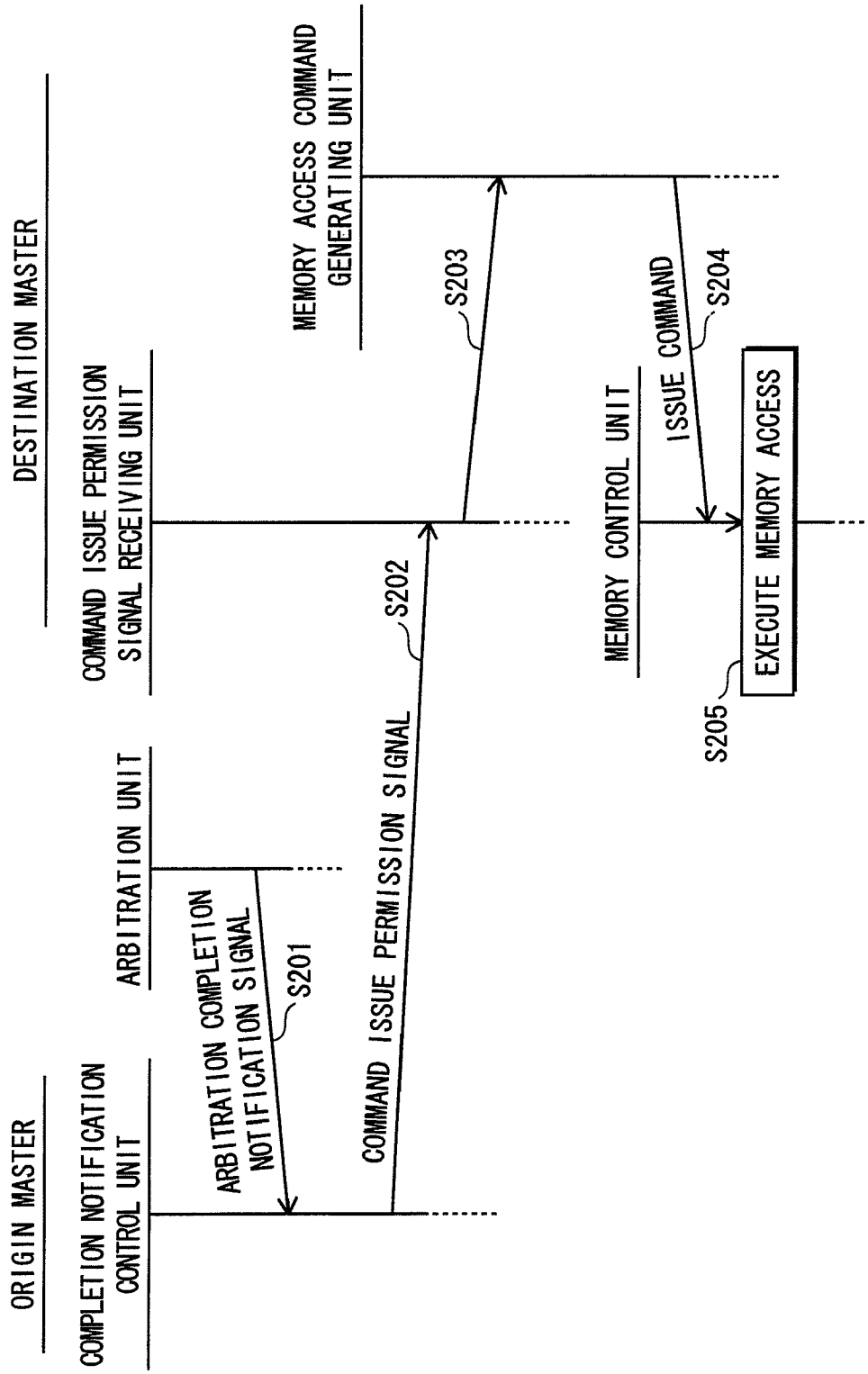
FIG. 18 and FIG. 19 are respective continuations.
Figure 19:
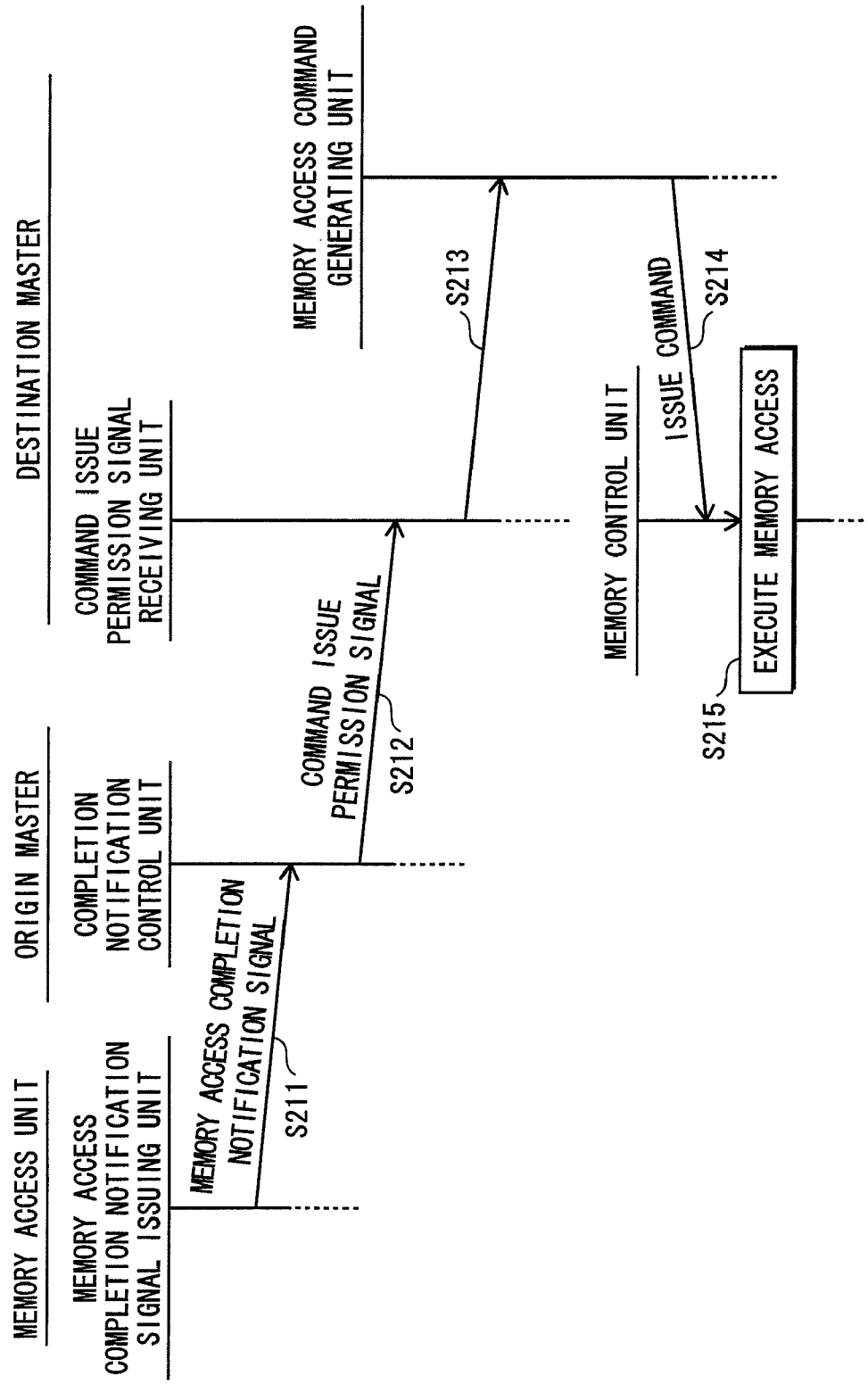

The flow of operations of the bus communication apparatus 10 in the present embodiment is now described with use of the sequence drawings shown in FIGS. 17 to 19.

In the bus communication apparatus 10 in the present embodiment, upon being activated, the origin master 101 sets, in the bus communication register 55, a bus communication flag and the destination master identifying the master with which bus communication will be performed (step S191).

Upon completing issuing of a command, the memory access command generating unit 91 issues a command issue completion signal to the completion notification control unit 92 (step S192).

Upon receiving the command issue completion signal (step S192), the completion notification control unit 92 has a command generation instruction signal issued to the destination master shown by the bus communication setting register 55 (step S193).

The command generation instruction/issue permission signal receiving unit 93 receives the command generation instruction signal (step S193), and according to an instruction from the command generation instruction/issue permission signal receiving unit 93 (step S194), the memory access command generating unit 54 generates a command of the destination master 102 (step S195), and moves into an issue wait state.

The completion notification control unit 92 judges, with use of the master information table 71, whether or not the destination master identified by the destination master ID has the highest priority right in the arbitration unit 21 (step S196).

When the destination master 102 does not have highest priority right (step S196), data coherency will be maintained without changing the order of execution (i.e., the destination command will be executed after the execution of the origin command), regardless of the timing with which the destination command is issued after the origin command performed by the bus communication is arbitrated by the arbitration unit 21. For this reason, based on the arbitration completion notification signal from the arbitration completion notification signal issuing unit 31 (step S201), the completion notification control unit 92 generates a command issue permission signal to the destination master 102, and conveys the command issue permission signal that shows that an issue wait state command may be issued (step S202).

Upon the command generation instruction/issue permission signal receiving unit 93 receiving the command issue permission signal (step S202), according to an instruction from the command generation instruction/issue permission signal receiving unit 93 (step S203), the memory access command generating unit 54 immediately issues a command that is an issue wait state (step S204). If command generation is not complete at the point in time at which the command issue permission signal is received, the memory access command generating unit 54 issues the command promptly when generation of the command is complete.

The memory control unit 11 receives the memory access command (step S204), and executes the received memory access command (step S205).

The described structure allows the destination master to generate and issue a command before the memory access by the origin master is complete, and thus improves bus transfer efficiency.

When the destination master 102 has the highest priority right (step S196), there is a possibility that, if a command of the destination master 102 becomes the arbitration target before the transfer from the origin master 101 is complete, the execution order of the origin command and the destination command will be reversed, and data coherency will not be able to be maintained. In this case, based on the memory access completion notification signal from the memory access completion notification signal issuing unit 41 (step S211), the completion notification control unit 92 issues a command issue permission signal to the destination master, to notify the destination master that a command may be issued (step S212).

When the command generation instruction/issue permission signal receiving unit 93 receives the command issue permission signal (step S212), according to the an instruction from the command generation instruction/issue permission signal receiving unit 93 (step S213), the memory access command generating unit 54 immediately issues a command that is an issue wait state (step 214).

The memory control unit 11 receives the memory access command (step S214), and executes the received memory access command (step S215).

As has been described, by using the present embodiment, an arbitration completion notification signal or a memory access completion notification signal is selected and used according whether or not the destination master has the highest priority right in the arbitration unit 21. This improves but transfer efficiency.

Fifth Embodiment

In the bus communication apparatus 10 of the fifth embodiment, the origin master 101 and the destination master 102 are structured as shown in FIG. 9. As with the bus communication apparatus 10 of the fourth embodiment, notification is made from the origin master 101 to the destination master 102 in two stages, namely the command generation instruction signal and the command issue permission signal.

The origin master 101 holds the slave attribute information table 81 shown in FIG. 8.

In the fifth embodiment, the completion of command issuing by the origin master 101 is the trigger for the command generation instruction signal to be issued to the destination master 102, as in the fourth embodiment. In addition, command generation in the destination master 102 is realized at a relatively early stage by issuing the command issue permission signal described in the second embodiment to the destination master 102. This improves bus transfer efficiency.

Figure 20:
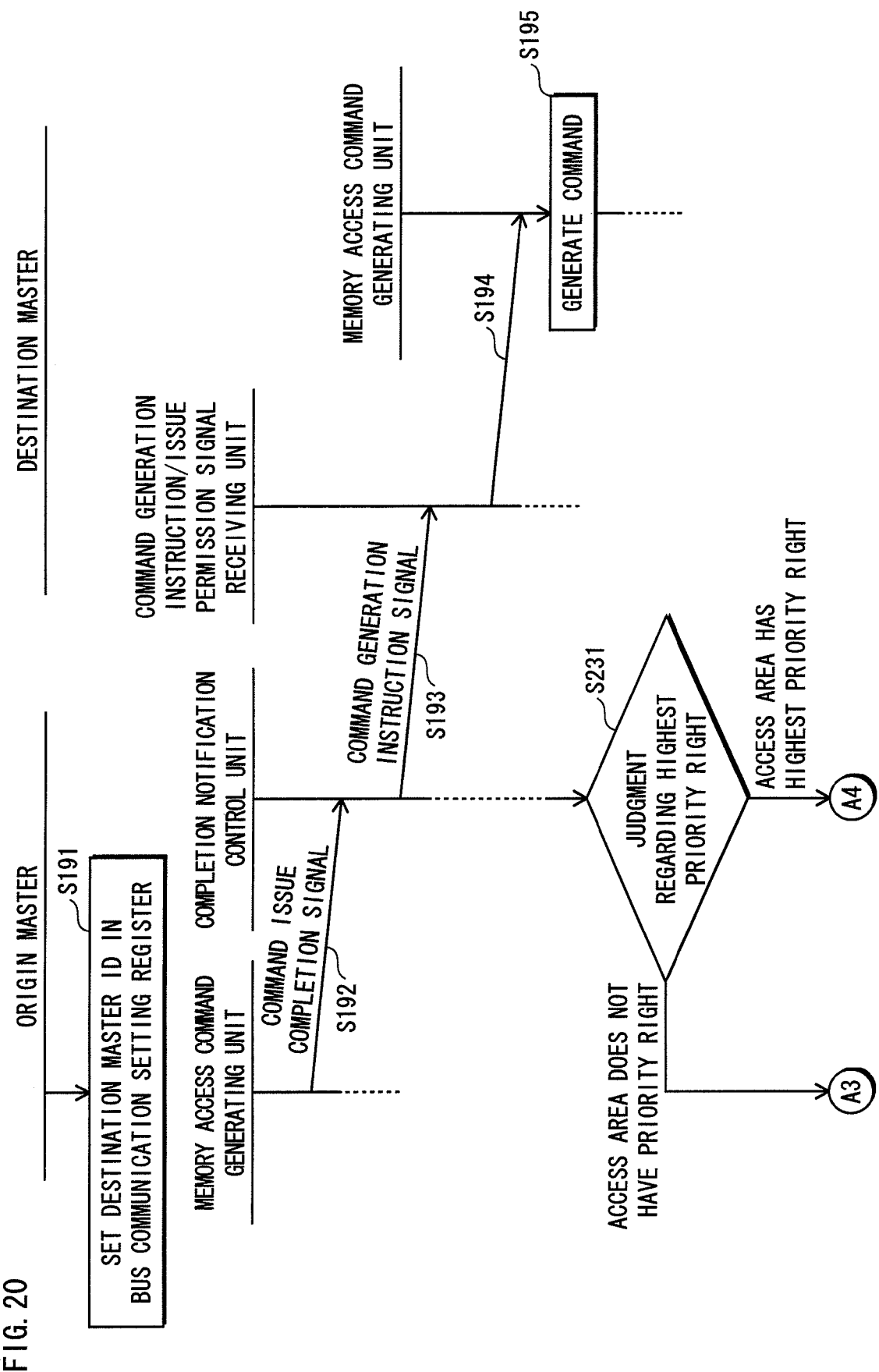
FIG. 20 is a sequence drawing pertaining to the bus communication apparatus 10 in the fifth embodiment.

The flow of operations of the bus communication apparatus 10 in the present embodiment is described with use of the sequence drawings in FIG. 20, FIG. 18 and FIG. 19.

In the bus communication apparatus 10 in the present embodiment, when the origin master 101 activates, the origin master 101 sets, in the bus communication setting register 55, a bus communication flag and the destination master ID identifying the master with which bus communication will be performed (step S191).

Upon completing issuing a command, the memory access command generating unit 91 issues a command issue completion signal to the completion notification control unit 92 (step S192).

Upon receiving the command issue completion signal (step S192), the completion notification control unit 92 has a command generation instruction signal issued to the destination master shown by the bus communication setting register 55 (step S193).

The command generation instruction/issue permission signal receiving unit 93 receives the command generation instruction signal (step S193), and according to an instruction from the command generation instruction/issue permission signal receiving unit 93 (step S194), the memory access command generating unit 54 generates a command of the destination master 102 (step S195), and moves to an issue wait state.

Next, using the slave attribute information table 81, the completion notification control unit 92 judges whether or not the area that is the target of access in the bus communication is an area that is arbitrated by the highest priority right in the arbitration unit 21 (step S231).

When the access area is not arbitrated by the highest priority right (step S231), based on the arbitration completion notification signal from the arbitration completion notification signal issuing unit 31 (step S201), the completion notification control unit 92 issues a command issue permission signal to the destination master, to convey the command issue permission signal showing that an issue wait state command may be issued to the destination master 102 (step S202).

When the command generation instruction/issue permission signal receiving unit 93 receives the command issue permission signal (step S202), according to an instruction from the command generation instruction/issue permission signal receiving unit 93 (step S203), the memory access command generating unit 54 immediately issues a command that is an issue wait state (step S204). The memory control unit 11 receives the memory access command (step S204), and executes the received memory access command (step S205).

When the access area is not arbitrated by the highest priority right (step S231), based on the memory access completion notification signal from the memory access completion notification signal generating unit 41 (step S211), the completion notification control unit 92 issues the command issue permission signal to the destination master 102, to convey to the destination master 102 that a command may be issued (step S212).

When the command generation instruction/issue permission signal receiving unit 93 receives the command issue permission signal (step S212), according to an instruction by the command generation instruction/issue permission signal receiving unit 93 (step S213), the memory access command generating unit 54 immediately issues a command that is an issue wait state (step S214). The memory control unit 11 receives the memory access command (step S214), and executes the received memory access command (step S215).

Sixth Embodiment

In the bus communication apparatus 10 of the sixth embodiment, the origin master 101 and the destination master 102 are structured as shown in FIG. 9. In addition, notification from the origin master 101 to the destination master 102 is performed in two stages, namely a command generation instruction signal and a command issue permission signal, as in the bus communication apparatus 10 in the fourth embodiment.

The origin master 101 holds both the master information table 71 showing which master holds the highest priority right in the arbitration unit 21, and the slave attribute information table 81 showing which area in the shared memory is arbitrated by the highest priority right in the arbitration unit 21.

In the sixth embodiment, the completion of command issuing by the origin master 101 is the trigger for the command generation instruction signal to be issued to the destination master 102, as in the fourth embodiment. In addition, command generation in the destination master 102 is realized at a relatively early stage by issuing the command issue permission signal described in the second embodiment to the destination master 102. This improves bus transfer efficiency.

Figure 21:
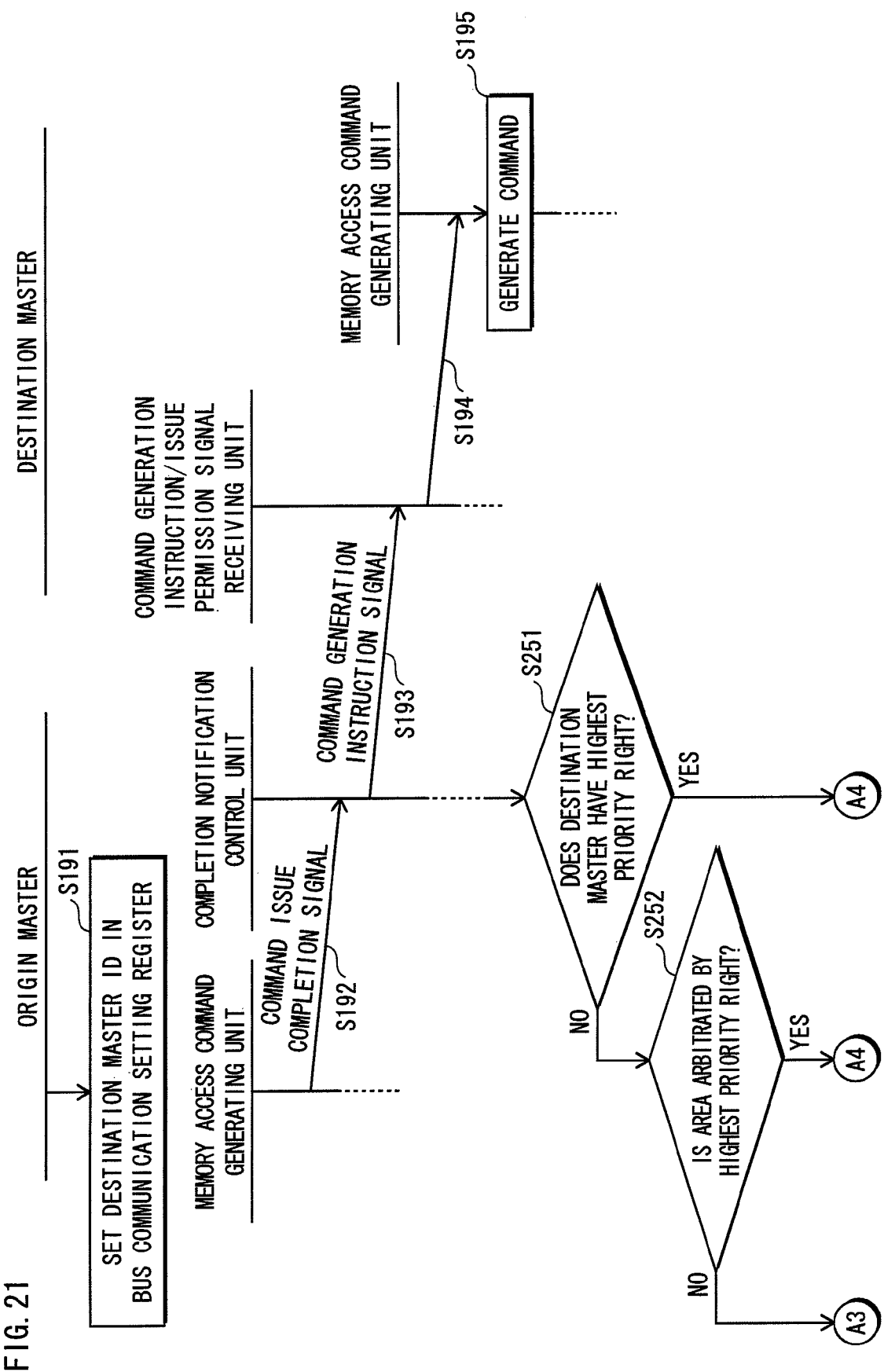
FIG. 21 is a sequence drawing pertaining to the bus communication apparatus 10 in the sixth embodiment.

The flow of operations of the bus communication apparatus 10 in the present embodiment is described with use of the sequence drawings in FIG. 21, FIG. 18 and FIG. 19.

In the bus communication apparatus 10 in the present embodiment, upon being activated, the origin master 101 sets, in the bus communication setting register 55, a bus communication flag and the destination master ID identifying the master with which bus communication will be performed (step S191).

Upon completing issuing a command, the memory access command generating unit 91 issues a command issue completion signal to the completion notification control unit 92 (step S192).

Upon receiving the command issue completion signal (step S192), the completion notification control unit 92 has a command generation instruction signal issued to the destination master shown by the bus communication setting register 55 (step S193).

The command generation instruction/issue permission signal receiving unit 93 receives the command generation instruction signal (step S193), and according to an instruction from the command generation instruction/issue permission signal receiving unit 93 (step S194), the memory access command generating unit 54 generates a command of the destination master 102 (step S195), and moves to an issue wait state.

Next, using the master information table 71, the completion notification control unit 92 judges whether or not the destination master shown by the set destination master ID has the highest priority right in the arbitration unit 21 (step S251).

Furthermore, using the salve attribute information table 81, the completion notification control unit 52 judges, with respect to the destination master shown by the set communication master ID, whether or not the area accessed in the bus communication is arbitrated by the highest priority right in the arbitration unit 21 (step S252).

When the destination master does not have the highest priority right (NO at step S251) and also the access area is not arbitrated by the highest priority right (NO at step S252), based on the arbitration completion notification signal from the arbitration completion notification signal issuing unit 31 (step S201), the completion notification control unit 92 issues a command issue permission signal to the destination master, to convey the command issue permission signal showing that an issue wait state command may be issued to the destination master 102 (step S202).

When the command generation instruction/issue permission signal receiving unit 93 receives the command issue permission signal (step S202), according to an instruction from the command generation instruction/issue permission signal receiving unit 93 (step S203), the memory access command generating unit 54 immediately issues a command that is an issue wait state (step 204). The memory control unit 11 receives the memory access command (step S204), and executes the received memory access command (step S205).

When the destination master does not have the highest priority right (NO at step S251) and also the access area is arbitrated by the highest priority right (YES at step S252), or when the destination master does have the highest priority right (YES at step S251), based on the memory access completion notification signal from the memory access completion notification signal issuing unit 41 (step S211), the completion notification control unit 92 issues a command issue permission signal to the destination master 102, to convey to the destination master 102 that a command may be issued (step S212).

When the command generation instruction/issue permission signal receiving unit 93 receives the command issue permission signal (step S212), according to the instruction from the command generation instruction/issue permission signal receiving unit 93 (step S213), the memory access command generating unit 54 immediately issues a command that is an issue wait state (step 214). The memory control unit 11 receives the memory access command (step S214), and executes the received memory access command (step S215).

As has been described, each of the embodiments is a control apparatus that, in bus communication between one master and another master, maintains coherency while also being capable of selectively using multiple levels of completion communication signals in order to increase transfer efficiency.

Here, the levels are various event phases such as a command issue phase, an arbitration completion phase, and a memory access completion phase. The command issue phase is a phase in which the origin master 101 issues a memory access command. The arbitration completion phase is a phase in which the arbitration unit 21 in the memory control unit 11 arbitrates a plurality of commands. The memory access phase is a phase in which memory access in accordance with a memory access command issued by the origin master 101 is completed. These phases are structured hierarchically. The completion communication signals in the levels in the hierarchy are, for instance, those shown in FIG. 11, namely a command issue completion signal 301 showing completion of command issuing, an arbitration completion notification signal 302 showing completion of command arbitration, and a memory access completion notification signal 303 showing completion of memory access performed in accordance with a command.

Each of the embodiments uses these completion notification signals selectively to increase bus transfer efficiency.

Although the present invention has been described based on the preferred embodiment, the present invention is by no means limited to the described embodiments. Cases such as the following are included in the present invention.

(1) All or part of the compositional elements of each apparatus may be composed of one system LSI (Large Scale Integrated circuit). The system LSI is a super-multifunctional LSI on which a plurality of compositional units are manufactured integrated on one chip, and is specifically a computer system that includes a microprocessor, a ROM, a RAM, or the like. A computer program is stored in the RAM. The system LSI achieves its functions by the microprocessor operating according to the computer program.

Furthermore, the units that are the compositional elements of each of the apparatuses may be realized separately with individual chips. Alternatively, part or all of the units may be included on one chip. Here, the LSI may be an IC, a system LSI, a super LSI, or ultra LSI, depending on the degree of integration.

Furthermore, the integration of circuits is not limited to being realized with LSI, but may be realized with a purpose-specific circuit or a general-use processor. Alternatively, the integration may be realized with use of an FPGA (field programmable gate array) that is programmable after manufacturing of the LSI, or a re-configurable processor that enables re-configuration of the connection and settings of circuit cells in the LSI.

Furthermore, if technology for an integrated circuit that replaces LSIs appears due to advances in or derivations from semiconductor technology, that technology may be used for integration of the functional blocks. Bio-technology is one possible application.

Specifically, the origin master 101, the destination master 102 and the memory control unit 11 may be constituted by one LSI as a single unit.

Alternatively, the origin master 101 may be constituted by a single LSI, the destination master 102 may be constituted by another signal LSI, and the memory control unit 11 may be constituted by yet another single LSI.

As a further alternative, the origin master 101 and the destination master 102 may be constituted by a same LSI, while the memory control unit 11 is constituted from a separate LSI.

(2) The bus communication apparatus is part of a device such as a digital broadcast reception apparatus, a DVD player, a BD player, or a mobile telephone. Such devices have therein a bus communication system that includes the bus communication apparatus.

(3) The present invention may be a method shown by the above description.

(4) A bus communication apparatus of a first aspect of the present invention includes a origin master, a destination master, a shared memory, and a memory control unit. The memory control unit includes: a command arbitration unit operable to arbitrate memory access commands from the origin master and the communication destination master, and give an access right to one of the memory access commands; a memory access unit operable to access the shared memory based on the memory access command that has obtained the access right; an arbitration completion notification signal issuing unit operable to issue an arbitration completion notification signal when the memory access command from the origin master has acquired the access right; and a memory access completion notification signal issuing unit operable to issue a memory access completion notification signal when processing of the memory access command from the origin master is complete. The origin master includes: a first command issuing unit operable to issue a memory access command for writing target data to the shared memory; and a completion notification control unit operable to programmably select one of an arbitration completion notification signal and a memory access completion notification signal, and issue a command issue permission signal based on the selected signal. The communication destination master includes: a second command issuing unit operable to issue a memory access command for reading target data from the shared memory.

With the stated structure, the arbitration completion notification signal and the memory access completion notification signal are selected programmably, and then a command issue permission signal is issued. Therefore, the timing with which the communication destination master generates a command can be controlled more flexibly than with a conventional technique that uses only a memory access completion notification signal.

Furthermore, a bus communication apparatus in a second aspect of the present invention includes a origin master, a destination master, a shared memory, and a memory control unit. The memory control unit includes: a memory access unit operable to access the shared memory based on a memory access command from the origin master or the communication destination master. The origin master includes: a first command issuing unit operable to issue a memory access command for writing target data to the shared memory; and a completion notification control unit operable to issue a command generation instruction signal when a memory access command is issued, and, with a time lag after issuing the command generation instruction signal, issue a second stage command issue permission signal with a time difference. The communication destination master includes: a second command issuing unit operable to, based on the command generation instruction signal, generate a memory access command for reading the target data from the shared memory, and operable to issue the generated memory access command based on the command issue permission signal.

With the stated structure, the generation of the memory access command starts in advance, at the point in time when the command generation instruction signal is received. Therefore, command generation is completed earlier than if it started when the command issue permission signal was received, and a command can be issued earlier.

In the bus communication apparatus in a third aspect of the present invention, the memory control unit further includes: a command arbitration unit operable to arbitrate memory access commands from a origin master and a communication destination master, and gives an access right to one of the memory access commands; an arbitration completion notification signal issuing unit operable to issue an arbitration completion notification signal when the memory access command from the origin master has acquired the access right; and a memory access completion notification signal issuing unit operable to issue a memory access completion notification signal when processing of the memory access command from the origin master is complete. The memory access unit is operable to access the shared memory based on the memory access command that acquired the access right. The completion notification control unit is operable to programmably select one of an arbitration completion notification signal and a memory access completion notification signal, and issue a command issue permission signal based on the selected signal.

With the stated structure, the arbitration completion notification signal and the memory access completion notification signal are programmably selected, triggered by the issuing of the command issue permission signal. This increases the flexibility of timing control for command generation in destination master.

In a bus communication apparatus of a fourth aspect of the present invention, the origin master further includes a master information table in which can be set information showing which master has the highest priority right in the arbitration unit. The completion notification control unit is operable to, when, as a result of referring to the master information table, a transfer destination master is found to have the highest priority right, select the memory access completion notification signal, and when the transfer destination master is found to not have the highest priority right, select the arbitration completion notification signal.

Here, when the destination master has the highest priority right, there is a possibility that the execution order of the origin command and the destination command will be reversed if the command of destination master becomes the target of arbitration before the transfer from the origin master is complete, and therefore data coherency will not be able to be maintained.

With the stated structure, since the command issue permission signal is generated based on the memory access completion notification signal, data coherency can be maintained.

On the other hand, when the destination master does not have the highest priority right in the arbitration unit, even if the destination command is issued at a relatively early stage, as long as arbitration of the command of the origin master by the arbitration unit is complete, the destination command will be executed after the origin command, without a change in the execution order occurring, and therefore data coherency will be maintained.

In this way, by programmably selecting the trigger for issuing a command issue permission signal based on whether or not the communication destination master has the highest priority right in the arbitration unit, data coherency can be maintained while also increasing bus transfer efficiency.

In a bus communication apparatus of a fifth aspect of the present invention, the origin master further includes a slave attribute information table in which can be set information showing access to which area in the shared memory has the highest priority right in the arbitration unit. The completion notification control unit is operable to, when, as a result of referring to the slave attribute information table, an access target area is found to have the highest priority right, select the memory access completion notification signal, and when the access target area is found to not have the highest priority right, select the arbitration completion notification signal.

With the stated structure, by programmably selecting the trigger for issuing a command issue permission signal based on whether or not the access target area has the highest priority right in the arbitration unit, data coherency can be maintained while also increasing bus transfer efficiency.

According to the present invention, destination commands can be issued earlier, and bus transfer efficiency is increased.

(5) The present invention may be any combination of the described embodiments and modifications.

The present invention is effective in a system LSI that performs bus communication of data using a shared memory. The present invention is also effective when applied to network communication and the like which performs data transfer and the like between network chips and a CPU.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A bus communication apparatus, comprising:
   a shared memory;
   a memory control unit operable to (a) arbitrate a plurality of commands, each of the plurality of commands instructing access to the shared memory, so as to give an access right to one of the plurality of commands, (b) output an arbitration completion signal showing that arbitration, with respect to the one command given the access right, is complete, (c) access the shared memory, based on the one command given the access right, and (d) when the accessing of the shared memory based on the one command given the access right is complete, output an access completion signal showing a completion of the accessing of the shared memory;
   a communication origin master operable to output a write command instructing a writing of target data to the shared memory, programmably select one of the arbitration completion signal and the access completion signal, and, based on the selected one of the arbitration completion signal and the access completion signal, output a permission signal showing that issuing of a command is permitted; and
   a communication destination master operable to output, based on the permission signal, a read command instructing a reading of the target data from the shared memory,
   wherein the communication origin master, in addition to outputting the write command, outputs a generation instruction signal instructing the read command to be generated, and after providing a time delay after the output of the generation instruction signal, outputs the permission signal showing that issuing of the read command is permitted, and
   wherein the communication destination master generates the read command, based on the generation instruction signal, and outputs the generated read command, based on the permission signal.

2. The bus communication apparatus of claim 1,
   wherein the memory control unit includes:
      a command arbitration sub-unit operable to arbitrate each of the plurality of commands instructing access to the shared memory, so as to give the access right to the one command;
      a memory access sub-unit operable to access the shared memory based on the one command given the access right by the command arbitration sub-unit;
      an arbitration completion signal output sub-unit operable to, when the one command given the access right by the command arbitration sub-unit has acquired the access right, output the arbitration completion signal; and
      an access completion signal output sub-unit operable to issue the access completion signal when the accessing of the shared memory based on the one command given the access right by the command arbitration sub-unit is complete, and
   wherein the communication origin master includes:
      a command output unit operable to output the write command; and
      a completion notification control unit operable to programmably select the one of the arbitration completion signal and the access completion signal, and, based on the selected one of the arbitration completion signal and the access completion signal, output the permission signal.

3. The bus communication apparatus of claim 2,
   wherein the communication origin master further includes a master information table storing therein priority information pieces in correspondence with each of a plurality of masters, each of the priority information pieces showing whether or not a corresponding master of the plurality of masters has a highest priority right in the command arbitration sub-unit, and
   wherein the completion notification control unit (a) judges, with use of a priority information piece of the priority information pieces that is in correspondence with the communication destination master in the master information table, whether or not the communication destination master has the highest priority right, (b) selects the access completion signal when the communication destination master is judged to have the highest priority right, and (c) selects the arbitration completion signal when the communication destination master is judged to not have the highest priority right.

4. A bus communication apparatus, comprising:
   a shared memory;
   a memory control unit operable to (a) arbitrate a plurality of commands, each of the plurality of commands instructing access to the shared memory, so as to give an access right to one of the plurality of commands, (b) output an arbitration completion signal showing that arbitration, with respect to the one command given the access right, is complete, (c) access the shared memory, based on the one command given the access right, and (d) when the accessing of the shared memory based on the one command given the access right is complete, output an access completion signal showing a completion of the accessing of the shared memory;
a communication origin master operable to output a write command instructing a writing of target data to the shared memory, programmably select one of the arbitration completion signal and the access completion signal, and, based on the selected one of the arbitration completion signal and the access completion signal, output a permission signal showing that issuing of a command is permitted; and
a communication destination master operable to output, based on the permission signal, a read command instructing a reading of the target data from the shared memory,
wherein the memory control unit includes:
    a command arbitration sub-unit operable to arbitrate each of the plurality of commands instructing access to the shared memory, so as to give the access right to the one command;
    a memory access sub-unit operable to access the shared memory based on the one command given the access right;
    an arbitration completion signal output sub-unit operable to, when the one command given the access right has acquired the access right, output the arbitration completion signal; and
    an access completion signal output sub-unit operable to issue the access completion signal when the accessing of the shared memory based on the one command given the access right is complete,
wherein the communication origin master includes:
    a command output unit operable to output the write command;
    a completion notification control unit operable to programmably select the one of the arbitration completion signal and the access completion signal, and, based on the selected one of the arbitration completion signal and the access completion signal, output the permission signal; and
    a slave attribute information table storing therein priority information pieces in correspondence with each of a plurality of masters and showing, with respect to each area of areas that compose the shared memory, whether or not access by a corresponding master of the plurality of masters has a highest priority right in a respective area of the areas, and
wherein the completion notification control unit (a) judges, with use of a priority information piece of the priority information pieces that in the slave attribute information table is in correspondence with an area, of the areas that comprise the shared memory, to be accessed by the communication destination master, whether or not an area, of the areas, to be accessed by the communication destination master has the highest priority right, (b) selects the access completion signal when the area to be accessed by the communication destination master is judged to have the highest priority right, and (c) selects the arbitration completion signal when the area to be accessed by the communication destination master is judged to not have the highest priority right.

5. A bus communication apparatus, comprising:
a shared memory;
a memory control unit operable to (a) arbitrate a plurality of commands, each of the plurality of commands instructing access to the shared memory, so as to give an access right to one of the plurality of commands, (b) output an arbitration completion signal showing that arbitration, with respect to the one command given the access right, is complete, (c) access the shared memory, based on the one command given the access right, and (d) when the accessing of the shared memory based on the one command given the access right is complete, output an access completion signal showing a completion of the accessing of the shared memory;
a communication origin master operable to output a write command instructing a writing of target data to the shared memory, programmably select one of the arbitration completion signal and the access completion signal, and, based on the selected one of the arbitration completion signal and the access completion signal, output a permission signal showing that issuing of a command is permitted; and
a communication destination master operable to output, based on the permission signal, a read command instructing a reading of the target data from the shared memory,
wherein the memory control unit includes:
    a command arbitration sub-unit operable to arbitrate each of the plurality of commands instructing access to the shared memory, so as to give the access right to the one command;
    a memory access sub-unit operable to access the shared memory based on the one command given the access right;
    an arbitration completion signal output sub-unit operable to, when the one command given the access right has acquired the access right, output the arbitration completion signal; and
    an access completion signal output sub-unit operable to issue the access completion signal when the accessing of the shared memory based on the one command given the access right is complete,
wherein the communication origin master includes:
    a command output unit operable to output the write command;
    a completion notification control unit operable to programmably select the one of the arbitration completion signal and the access completion signal, and, based on the selected one of the arbitration completion signal and the access completion signal, output the permission signal;
    a master information table storing therein first priority information pieces in correspondence with each of a plurality of masters, each of the first priority information pieces showing whether or not a corresponding master of the plurality of masters has a highest priority right in the command arbitration sub-unit; and
    a slave attribute information table storing therein priority information pieces in correspondence with each of a plurality of masters and showing, with respect to each area of areas that compose the shared memory, whether or not access by a corresponding master of the plurality of masters has the highest priority right in a respective area of the areas, and
wherein the completion notification control unit (a) judges, with use of a first priority information piece of the first priority information pieces that is in correspondence with the communication destination master in the master information table, whether or not the communication destination master has the highest priority right, (b) judges, with use of a priority information piece of the priority information pieces that in the slave attribute information table is in correspondence with an area, of the areas that comprise the shared memory, to be accessed by the communication destination master, whether or not an area, of the areas, to be accessed by the communication destination master has the highest priority right, (c) selects the arbitration completion signal when the communication destination master is judged to not have the highest priority right and the area to be accessed by the communication destination master is also judged to not have the highest priority right, and (d) selects the access completion signal (i) when the communication destination master is judged to have the highest priority right, or (ii) when the communication destination master is judged to not have the highest priority right and also the area to be accessed by the communication destination master is judged to have the highest priority right.

6. A control method used in a bus communication apparatus composed of a shared memory, a memory control unit, a communication origin master and a communication destination master, the control method comprising the steps of:

in the communication origin master, outputting a write command instructing a writing of target data to the shared memory;

in the memory control unit, arbitrating a plurality of commands, each of the plurality of commands instructing access to the shared memory, so as to give an access right to one of the plurality of commands;

in the memory control unit, outputting an arbitration completion signal showing that arbitration, with respect to the one command given the access right, is complete;

in the memory control unit, accessing the shared memory, based on the one command given the access right;

in the memory control unit, when the accessing of the shared memory based on the one command given the access right is complete, outputting an access completion signal showing a completion of the accessing of the shared memory;

in the communication origin master, programmably selecting one of the arbitration completion signal and the access completion signal, and, based on the selected one of the arbitration completion signal and the access completion signal, outputting a permission signal showing that issuing of a command is permitted;

in the communication destination master, outputting, based on the permission signal, a read command instructing a reading of the target data from the shared memory, in the communication origin master, in addition to outputting the write command, outputting a generation instruction signal instructing the read command to be generated, and after providing a time delay after the outputting of the generation instruction signal, outputting the permission signal showing that issuing of the read command is permitted; and in the communication destination master, generating the read command, based on the generation instruction signal, and outputting the generated read command, based on the permission signal.

7. An integrated circuit, comprising:

a memory control unit operable to (a) arbitrate a plurality of commands, each of the plurality of commands instructing access to a shared memory, so as to give an access right to one of the plurality of commands, (b) output an arbitration completion signal showing that arbitration, with respect to the one command given the access right is complete, (c) access the shared memory, based on the one command given the access right, and (d) when the accessing of the shared memory based on the one command given the access right is complete, output an access completion signal showing a completion of the accessing of the shared memory;

a communication origin master operable to output a write command instructing writing of target data to the shared memory, programmably select one of the arbitration completion signal and the access completion signal, and, based on the selected one of the arbitration completion signal and the access completion signal, output a permission signal showing that issuing of a command is permitted; and a communication destination master operable to output, based on the permission signal, a read command instructing a reading of the target data from the shared memory, wherein the communication origin master, in addition to outputting the write command, outputs a generation instruction signal instructing the read command to be generated, and after providing a time delay after the output of the generation instruction signal, outputs the permission signal showing that issuing of the read command is permitted, and wherein the communication destination master generates the read command, based on the generation instruction signal, and outputs the generated read command, based on the permission signal.

8. A master circuit, comprising:

a memory control circuit including:
a command arbitration unit operable to arbitrate each of a plurality of commands instructing access to a shared memory, so as to give an access right to one of the plurality of commands;
a memory access unit operable to access the shared memory based on the one command given the access right; and
an arbitration completion signal output unit operable to, when the one command given the access right has acquired the access right, output an arbitration completion signal; and
an access completion signal output unit operable to issue an access completion signal when the accessing of the shared memory based on the one command given the access right is complete;

a command output unit operable to output a write command instructing a writing of target data to the shared memory; and a completion notification control unit operable to programmably select one of the arbitration completion signal and the access completion signal output from the memory control circuit, and, based on the selected one of the arbitration completion signal and the access completion signal, output a permission signal, wherein the command output unit, in addition to outputting the write command, outputs a generation instruction signal instructing a read command to be generated, and after providing a time delay after the output of the generation instruction signal, outputs the permission signal showing that issuing of the read command is permitted, and wherein the read command is generated based on the generation instruction signal, and is output based on the permission signal.

9. A bus communication apparatus, comprising:

a shared memory;

a memory control unit operable to (a) arbitrate a plurality of commands, each of the plurality of commands instructing access to the shared memory, so as to give an access right to one of the plurality of commands, (b) output an arbitration completion signal showing that arbitration, with respect to the one command given the access right, is complete, (c) access the shared memory, based on the one command given the access right, and (d) when the accessing of the shared memory based on the one command given the access right is complete, output an access completion signal showing a completion of the accessing of the shared memory;

a communication origin master operable to (a) output (i) a write command instructing a writing of target data to the shared memory, and (ii) a generation instruction signal instructing a read command to be generated, the read command instructing a reading of target data from the shared memory, and (b) after providing a time delay after the output of the generation instruction signal, output a permission signal showing that issuing of the read command is permitted; and a communication destination master operable to generate the read command, based on the generation instruction signal, and output the generated read command, based on the permission signal.

10. A bus communication apparatus, comprising:

a shared memory;

a memory control unit operable to (a) arbitrate a plurality of commands, each of the plurality of commands instructing access to the shared memory, so as to give an access right to one of the plurality of commands, (b) output an arbitration completion signal showing that arbitration, with respect to the one command given the access right, is complete, and (c) access the shared memory, based on the one command given the access right;

a communication origin master operable to (a) output a write command instructing a writing of target data to the shared memory, (b) judge whether or not access relating to the write command has a highest priority right in the arbitration performed by the memory control unit, and (c) when the access is judged to not have the highest priority right, output a permission signal after receiving the arbitration completion signal with respect to the write command, the permission signal showing that issuing of a command is permitted; and a communication destination master operable to, when the permission signal is received, output a read command instructing a reading of the target data from the shared memory, wherein the communication origin master, in addition to outputting the write command, outputs a generation instruction signal instructing the read command be generated, and after providing a time delay after the output of the generation instruction signal, outputs the permission signal showing that issuing of the read command is permitted, and wherein the communication destination master generates the read command, based on the generation instruction signal, and outputs the generated read command, based on the permission signal.

* * * * *